(12) United States Patent
Leeds et al.

(10) Patent No.: US 10,467,540 B2
(45) Date of Patent: Nov. 5, 2019

(54) ESTIMATING CONFIDENCE BOUNDS FOR RAINFALL ADJUSTMENT VALUES

(71) Applicant: The Climate Corporation, San Francisco, CA (US)

(72) Inventors: Bill Leeds, San Francisco, CA (US); Valliappa Lakshmanan, Bellevue, WA (US); Francisco Alvarez, Seattle, WA (US); Natalia Hryniw, Seattle, WA (US)

(73) Assignee: The Climate Corporation, San Francisco, CA (US)

( * ) Notice: Subject to any disclaimer, the term of this patent is extended or adjusted under 35 U.S.C. 154(b) by 676 days.

(21) Appl. No.: 15/171,471

(22) Filed: Jun. 2, 2016

(65) Prior Publication Data

US 2017/0351963 A1    Dec. 7, 2017

(51) Int. Cl.
| | | |
|---|---|---|
| *G06F 15/18* | (2006.01) | |
| *G06N 7/00* | (2006.01) | |
| *G01W 1/14* | (2006.01) | |
| *G01W 1/18* | (2006.01) | |
| *G01S 7/00* | (2006.01) | |
| *G01S 13/95* | (2006.01) | |

(52) U.S. Cl.
CPC .............. *G06N 7/005* (2013.01); *G01S 7/003* (2013.01); *G01S 13/951* (2013.01); *G01W 1/14* (2013.01); *G01W 1/18* (2013.01); *Y02A 90/18* (2018.01)

(58) Field of Classification Search
CPC .......... G06Q 50/02; G01W 1/10; G01W 1/14; G06N 7/005

USPC ....................................................... 706/15, 45
See application file for complete search history.

(56) References Cited

U.S. PATENT DOCUMENTS

| | | | |
|---|---|---|---|
| 2016/0232621 A1* | 8/2016 | Ethington | ........ G06Q 10/06315 |
| 2017/0161627 A1* | 6/2017 | Xu | .......................... G06N 7/005 |
| 2017/0261645 A1* | 9/2017 | Kleeman | ................. G01W 1/10 |
| 2017/0300602 A1* | 10/2017 | Leeds | ...................... G01W 1/14 |
| 2017/0316124 A1* | 11/2017 | Lee | ...................... G06F 17/5009 |
| 2017/0336533 A1* | 11/2017 | Alvarez | .................. G01W 1/10 |

* cited by examiner

*Primary Examiner* — David R Vincent
(74) *Attorney, Agent, or Firm* — Hickman Palermo Becker Bingham LLP; Sanjeev S. Bajwa

(57) ABSTRACT

A method for estimating confidence bounds for adjusted rainfall values for a set of geo-locations using agricultural data comprises using a server computer system that receives, via a network, agricultural data records that are used to estimate rainfall values for the set of geo-locations. Within the server computer system, rainfall calculation instructions receive digital data including observed radar and rain-gauge agricultural data records. The computer system then aggregates the agricultural data records and creates and stores the agricultural data sets. The agricultural data records are then used to estimate adjusted rainfall values for a set of geo-locations. Rainfall confidence bounds instructions estimate a set of confidence bounds for each of the adjusted rainfall values for the set of geo-locations. The set of confidence bounds provide a range for each of the adjusted rainfall values that represents a particular level of confidence associated with each of the adjusted rainfall values.

24 Claims, 16 Drawing Sheets

Fig. 2
(a)
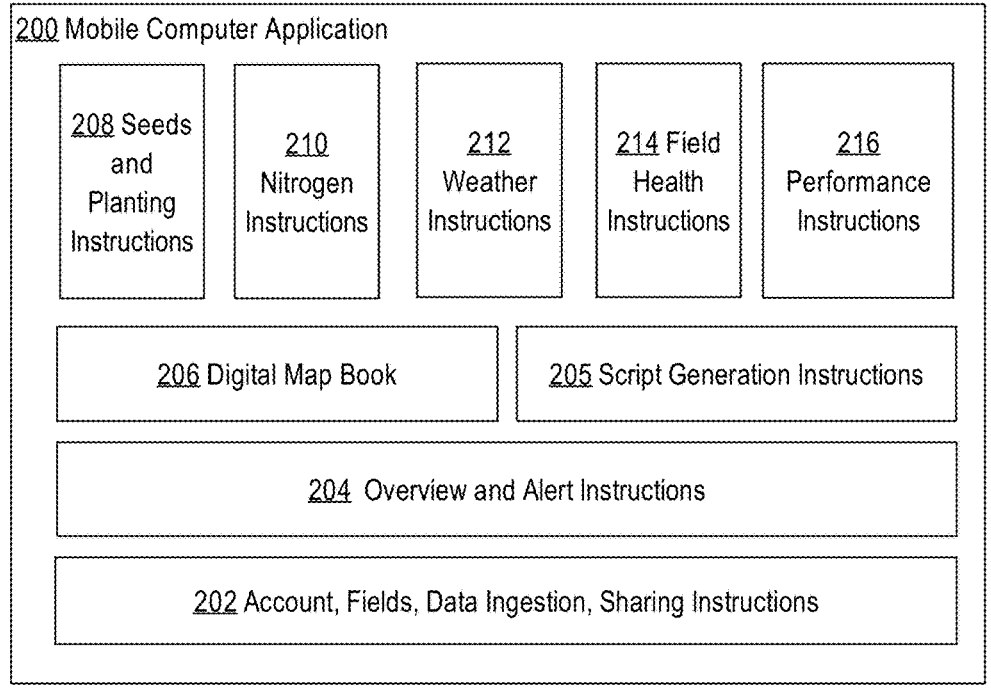
(b)
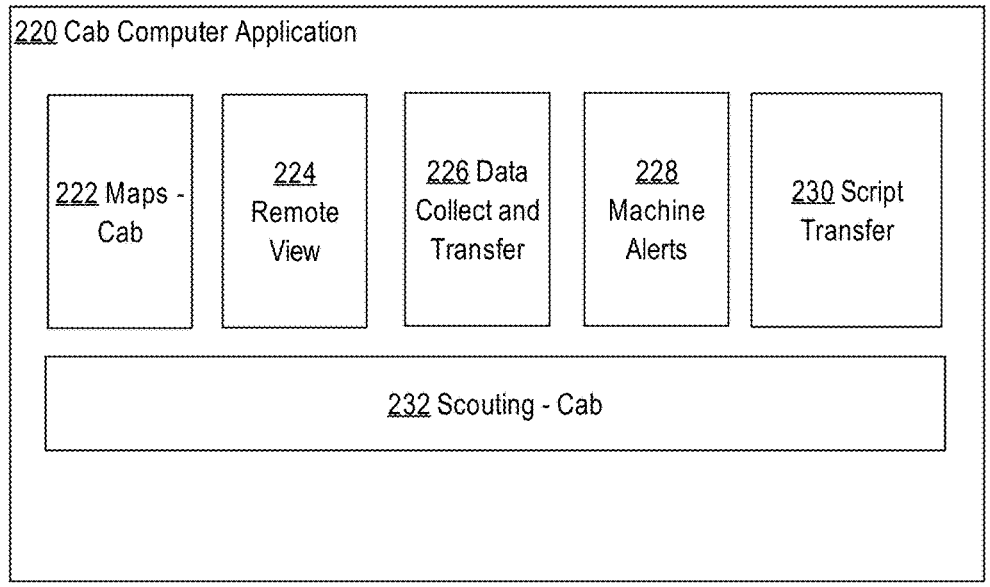

Data Manager

| Nitrogen | Planting | Practices | Soil |

Planting 1(4 Fields)
Crop Corn Product
Plant Date: 2016-04-12
ILU 112 | Pop: 34000
[Edit] [Apply]

Planting 2(0 Fields)
Crop Corn Product
Plant Date: 2016-04-15
ILU 83 | Pop: 34000
[Edit] [Apply]

Planting 3(0 Fields)
Crop Corn Product
Plant Date: 2016-04-13
ILU 83 | Pop: 34000
[Edit] [Apply]

Planting 4(1 Fields)
Crop Corn Product
Plant Date: 2016-04-13
ILU 112 | Pop: 34000
[Edit] [Apply]

[+] Add New Planting Plan

| | | CROP | PLANTED ACRES | PRODUCT | RELATIVE MATURITY | TARGET YIELD | POPULATION(AVG) | PLA |
|---|---|---|---|---|---|---|---|---|
| ☐ | Select All | | | | | | | |
| ☐ | Ames, IA 1<br>Corn \| 100 \| Boone, IA | Corn | — | DMC82-M | 112 | 160 | 34000 | Apr |
| ☐ | Austin, MN 1<br>Corn \| 100 \| Fredricks, MN | Corn | — | DMC82-M | 114 | 160 | 36000 | Apr |
| ☐ | Boone, IN 1<br>Corn \| 100 \| Boone, IA | Corn | — | DMC82-M | 112 | 150 | 34000 | Apr |
| ☐ | Champaign 1<br>Corn \| 100 \| Champaign, IL | Corn | — | — | 112 | 200 | 34000 | Apr |
| ☐ | E Nebraska 1<br>Corn \| 100 \| Burt, NE | Corn | — | — | 112 | 160 | 34000 | Apr |

ESTIMATING CONFIDENCE BOUNDS FOR RAINFALL ADJUSTMENT VALUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2016 The Climate Corporation.

FIELD OF THE DISCLOSURE

The present disclosure relates to predicting confidence intervals for rainfall estimates for a set of geo-locations based on observed rainfall estimates.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Rainfall predictions have become an integral part of agricultural planning. Growers commonly make management decisions based on rainfall estimates. Rainfall estimations can be based on different types of rain sensing instruments including weather radars and rain gauges. Weather radars provide wide spatial coverage and average rainfall over a given area. However, radar based estimates may be biased because they depend on certain latent variables, such as rain drop size, and detect water content aloft as opposed to water surface content.

Rain gauges provide more accurate point estimates because they measure actual rain accumulation on the ground. However, rain-gauge data may vary based upon the location of the rain gauge in a field and may be localized to the fields where they are installed. Utilization of rain gauge instruments does not provide large spatial coverage to estimate large areas.

Additionally, precipitation estimates often include confidence bounds that are used to determine reliability of the precipitation estimates. However, confidence bounds are generally based upon static data such as historical precipitation observations. Historical precipitation observations do not account for the variability in the relationship between radar observations and rain gauge observations and do not account for different precipitation types that may occur or have occurred in the historical precipitation observations. Confidence bounds that are solely based on historical precipitation observations may lead to inaccurate reporting of the reliability of precipitation estimates to growers.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

DETAILED DESCRIPTION

Figure 1:
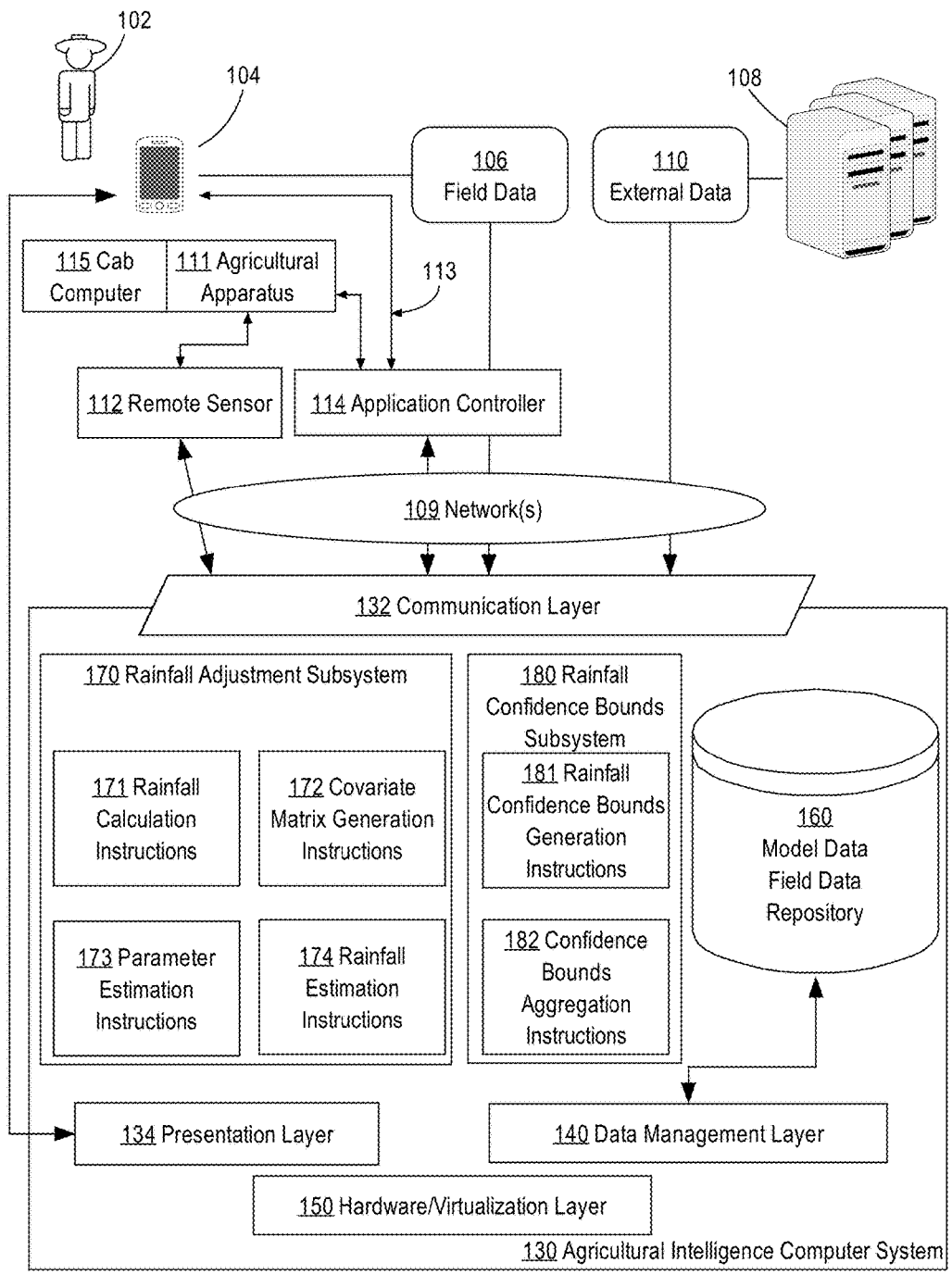
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. RAINFALL SUBSYSTEMS
   2.6. IMPLEMENTATION EXAMPLE—HARDWARE OVERVIEW
3. FUNCTIONAL OVERVIEW—ESTIMATING RAINFALL ADJUSTMENT VALUES
   3.1. RECEIVING DATA AND AGGREGATING DATA RECORDS
   3.2. ESTIMATING RAINFALL VALUES AND CONFIDENCE BOUNDS
4. RAINFALL ESTIMATION TECHNIQUES
   4.1. RAINFALL REGRESSION MODEL BASED ON KRIGING
      4.1.1. TRANSFORMING DATA RECORDS
      4.1.2. GENERATING COVARIATE MATRIX
      4.1.3. GENERATING RAINFALL REGRESSION MODEL
      4.1.4. ESTIMATING ADJUSTED RAINFALL VALUES
      4.1.5. DETERMINING CONFIDENCE BOUNDS
   4.2. MEAN FIELD BIAS
      4.2.1. ESTIMATING RAINFALL VALUES USING CORRECTION FACTOR
      4.2.2. DETERMINING CONFIDENCE BOUNDS
   4.3. GAMMA DISTRIBUTION WITH COPULA
      4.3.1. ESTIMATING RAINFALL VALUES USING GAUSSIAN COPULA
      4.3.2. DETERMINING CONFIDENCE BOUNDS
5. EXPORTING CONFIDENCE BOUNDS
   5.1. AGGREGATING CONFIDENCE BOUNDS
   5.2. EXPORTING AND PRESENTING CONFIDENCE BOUNDS

\* \* \*

1. General Overview

A computer system and a computer-implemented method that are configured for estimating confidence bounds for adjusted rainfall values for a set of geo-locations using agricultural data is provided. In an embodiment, estimating confidence bounds for adjusted rainfall values may be accomplished using a server computer system that is configured and programmed to receive over a digital communication network, electronic digital data representing agricultural data records, including records that represent observed agricultural data points for specific geo-locations at a specific time. Observed agricultural data points may include at least one of observed radar data or observed rain gauge that that includes a plurality of precipitation data values that have been obtained from radar computers coupled to radars or weather station computers coupled to rain gauges. Using digitally programmed rainfall calculation instructions, the computer system is programmed to receive digital data including observed radar and rain-gauge agricultural data records. Using the digitally programmed rainfall calculation instructions, the computer system is programmed to aggregate the one or more agricultural data records and store, in computer memory, one or more agricultural data sets, where each agricultural data set represents a single type of observed agricultural data.

Using rainfall estimation instructions, the computer system is programmed to estimate adjusted rainfall values for a set of geo-locations using the one or more agricultural data sets. Adjusted rainfall values may represent calculated rainfall value estimations that are based upon calculated adjustment factors. Using rainfall confidence bounds instructions, the computer system is programmed to estimate a set of confidence bounds for the adjusted rainfall values for the set of geo-locations. The set of confidence bounds provide a range for each of the adjusted rainfall values for the set of geo-locations that represents a particular level of confidence associated with each of the adjusted rainfall values for the set of geo-locations.

Using the rainfall confidence bounds instructions, the computer system is programmed to export the set of confidence bounds associated with the adjusted rainfall values to one or more agricultural machines, where the exported set of confidence bounds may be used to update scheduled agricultural tasks performed by the one or more agricultural machines.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGR-ESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
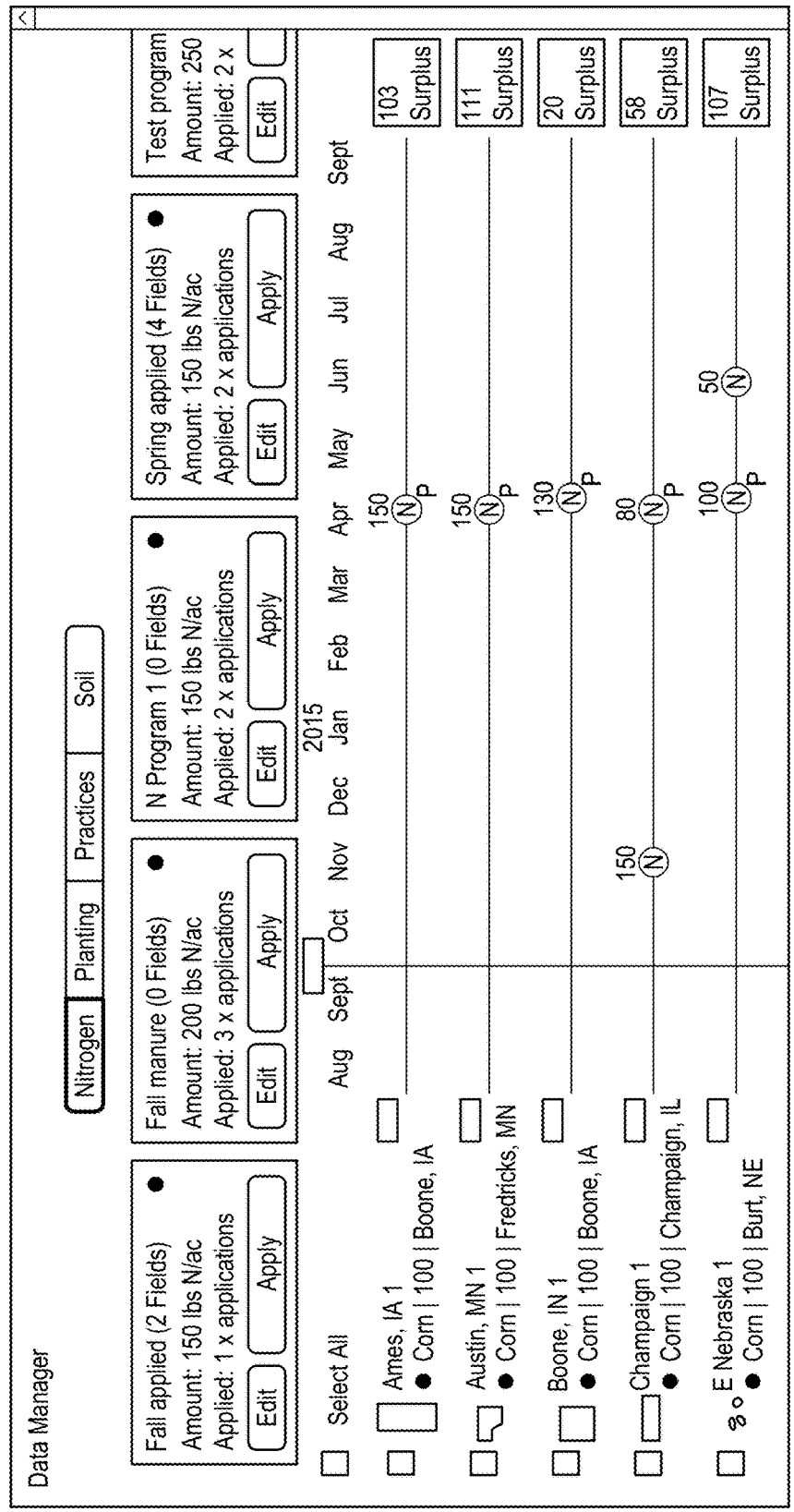
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts;

instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
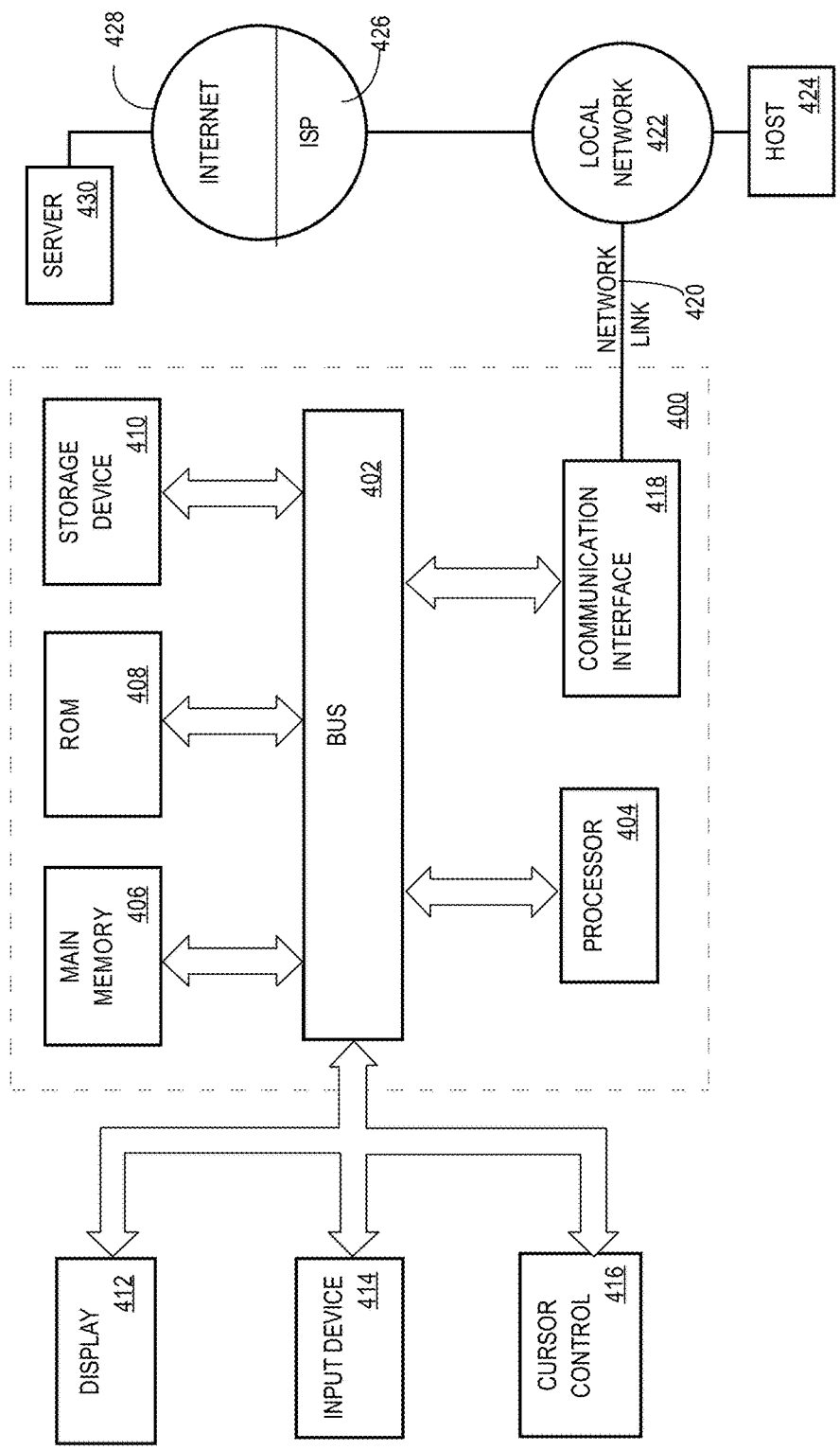
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph.

The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4 Process Overview—Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including, but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
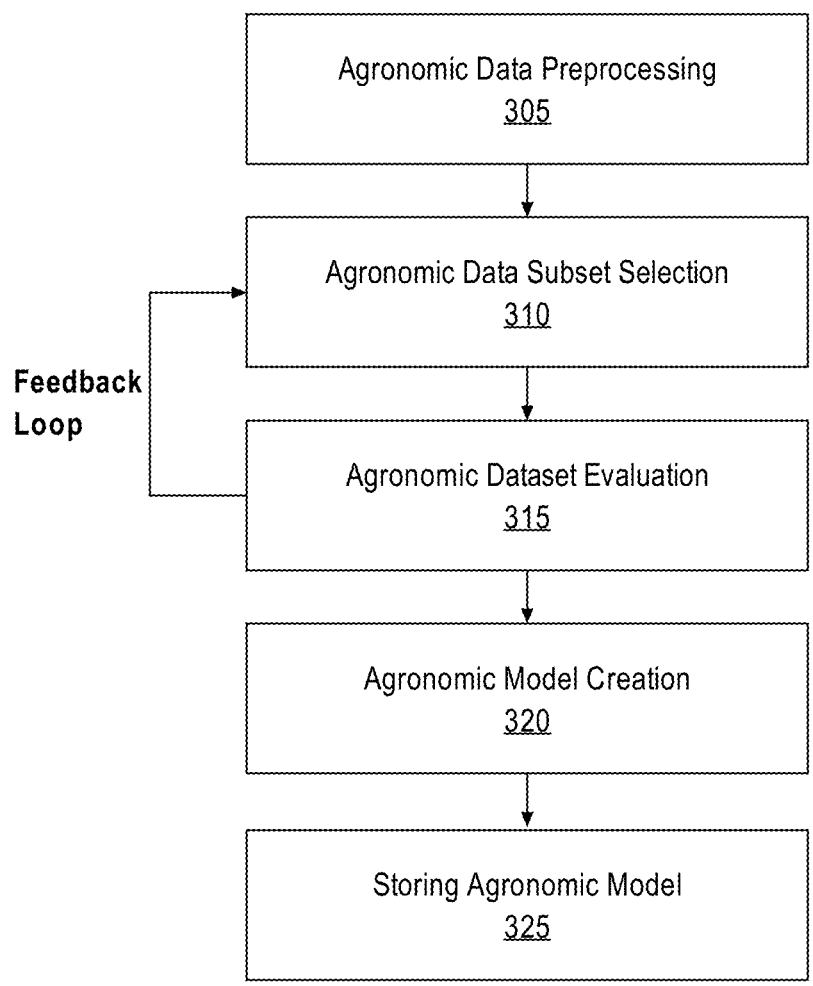
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Rainfall Subsystems

In an embodiment, the agricultural intelligence computer system 130, among other components, includes a rainfall adjustment subsystem 170 and a rainfall confidence bounds subsystem 180. The rainfall adjustment subsystem 170 is configured to estimate rainfall measurements for new geographic areas by determining adjustment values that are applied to measured rainfall observations. The adjustment values are determined using a digital rainfall model that is generated using specific observations of geo-locations that include multiple types of rain observations. The rainfall confidence bounds subsystem 180 is configured to calculate an upper and lower confidence bounds for each adjusted rainfall value determined. The confidence bounds provide a range of rainfall values that represent a particular level of confidence that is associated with the adjusted rainfall value determined. The agricultural intelligence computer system 130 may use the estimated rainfall measurements and their associated confidence bounds to display precipitation models on the field manager computer device 104.

In an embodiment, the rainfall adjustment subsystem 170 and the rainfall confidence bounds subsystem 180 each contain specially configured logic including, but not limited to, rainfall calculation instructions 171, covariate matrix generation instructions 172, parameter estimation instructions 173, rainfall estimation instructions 174, rainfall confidence bounds generation instructions 181, and confidence bounds aggregation instructions 182. Each of the rainfall calculation instructions 171, covariate matrix generation instructions 172, parameter estimation instructions 173, rainfall estimation instructions 174, rainfall confidence bounds generation instructions 181, and confidence bounds aggregation instructions 182 comprises executable instructions loaded into a set of one or more pages of main memory, such as RAM, in the agricultural intelligence computer system 130 which when executed cause the agricultural intelligence computer system 130 to perform the functions or operations that are described herein with reference to those modules. For example, the rainfall calculation instructions 171 may comprise executable instructions loaded into a set of pages in RAM that contain instructions which when executed cause performing the rainfall calculation functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the rainfall calculation instructions 171, covariate matrix generation instructions 172, parameter estimation instructions 173, and rainfall estimation instructions 174 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system 130 to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130. The executable instructions in memory, or the stored source code, specified in this paragraph are examples of "modules" as that term is used in this disclosure.

The rainfall calculation instructions 171 provide instructions to perform aggregation of agricultural data records into one or more agricultural data sets, where an agricultural data set represents a set of a single type of observed agricultural data. The rainfall calculation instructions 171 provide further instructions to perform transformation of the one or more agricultural data sets into one or more agricultural distribution sets, where an agricultural distribution set represents a normalized distribution of an agricultural data set. The covariate matrix generation instructions 172 provide instructions to generate covariate matrices, where the covariate matrices are based upon derived values from the one or more agricultural distribution sets. The parameter estimation instructions 173 provide instruction to estimate regression parameters for a rainfall regression model, where the rainfall regression model based upon the one or more agricultural distribution sets. The rainfall regression model and the regression parameters are then used to estimate rainfall adjustment values in new geo-locations. The rainfall estimation instructions 174 provide instructions to estimate adjusted rainfall values for new geo-locations using one or more digital rainfall models and one or more agricultural distribution sets from other geo-locations. The confidence bounds generation instructions 181 provide instructions to generate a set of confidence bounds for each of the estimated adjusted rainfall values that define a range of adjusted rainfall values that are within a desired level of confidence. The confidence bounds aggregation instructions 182 provide instructions to aggregate the set of confidence bounds to generate a set of aggregated confidence bounds that represent confidence bounds for a set of geo-locations over a specified period of time.

2.6 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Functional Overview—Estimating Rainfall Adjustment Values

Figure 7:
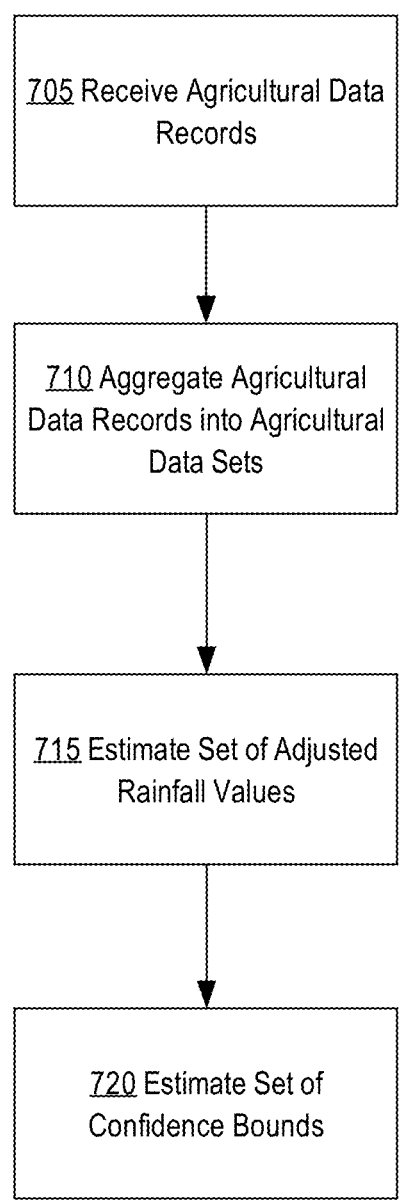
FIG. 7 depicts an example method of estimating a set of adjusted rainfall values and a set of confidence bounds for a set of geo-locations based upon received agricultural data.

FIG. 7 depicts a detailed example of estimating a set of adjusted rainfall values and a set of confidence bounds for a set of geo-locations.

3.1. Receiving Data and Aggregating Data Records

At step 705, agricultural data records are received. For example, agricultural intelligence computer system 130 may receive external data 110 from external data server computer 108. External data 110 may be agricultural data related to precipitation including, but not limited to, radar data and rain-gauge data.

External radar data may refer to radar data from an external data server computer 108 such as Next-Generation Radar (NEXRAD), although other embodiments may use other data sources. NEXRAD is a network of high-resolution Doppler weather radars operated by the National Weather Service of the United States. NEXRAD detects precipitation and atmospheric movement. NEXRAD observations may be in the form of radar reflectivity. Radar reflectivity measures intensity of precipitation by emitting pulses of energy into the atmosphere and then measuring the amount of energy that is scattered back to the radar dish. Radar reflectivity from NEXRAD and other radar data sources may be processed from radar reflectivity to rainfall accumulation values. Converting radar reflectivity to rainfall accumulation values may be performed using publicly available algorithms such as the Warning Decision Support System-Integrated Information (WDSS-II) suite. In an embodiment, the external data 110 received is in the form of radar data that has been processed and represents rainfall accumulation records for specific geo-locations.

In an embodiment, external data 110 may include rainfall measurements derived from rain gauge observations. For example, external data server computer 108 may represent a publicly available rain gauge collection system such as the Meteorological Assimilation Data Ingest System (MADIS). Embodiments of the external data server computer 108 may include other public or private repositories of rain gauge observations.

At step 710 the agricultural data records are aggregated into one or more agricultural data sets. An agricultural data set may represent observed agricultural data records originating from a single type of external data 110 for specific geo-locations. For example, the rainfall calculation instructions 171 provide instruction to the agricultural intelligence computer system 130 to aggregate agricultural data records for specific geo-locations into one or more agricultural data sets, where each agricultural data set represents a specific type of external data 110.

In an embodiment, an agricultural data set may be formatted as an n-dimensional vector representing rainfall measurements derived from rain-gauge data. Data within the n-dimensional vector may include rainfall measurements from specific geo-locations at different times. For example, n-dimensional vector "z" contains rain-gauge rainfall measurements from geo-locations $\{s_1, \ldots, s_n\}$ such that, $z=(z(s_1), \ldots, z(s_n))^T$.

In an embodiment, an agricultural data set may be formatted as an n-dimensional vector representing radar-derived rainfall measurements, where n-dimensional vector, "w" is made up of geo-locations $\{s_1, \ldots, s_n\}$ as $w=(w(s_1), \ldots, w(s_n))^T$. The radar-derived rainfall measurements represent an average value, $\tilde{w}(s_i)$, for a given pixel based upon the average value of the pixel and it's surrounding neighbors. For instance, for given geo-location $s_i$, the radar-derived rainfall estimate is:

$$\tilde{w}(s_i) = \frac{1}{|N_i|} \sum_{j \in N_i} w(s_j)$$

where $N_i$ is the set of all pixels in a neighborhood of $s_i$. A neighborhood may include a 5×5 grid centered around pixel $s_i$. Other embodiments of a neighborhood may be configured to include differently sized grids.

3.2. Estimating Rainfall Values and Confidence Bounds

At step 715, the system is programmed to estimate adjusted rainfall values for a set of geo-locations corresponding to the agricultural data records that were received at step 705. For example, the rainfall estimation instructions provide instruction to the agricultural intelligence computer system 130 to estimate adjusted rainfall values for geo-locations corresponding to the received agricultural data records using one or more digital rainfall models, where the digital rainfall models are based upon received radar-derived rainfall measurements and rain-gauge rainfall measurements. In an embodiment, digital rainfall models may be generated using different modeling techniques including, but not limited to, a regression model generated using kriging with external drift, a mean field bias model, and a Gaussian copula model. Details describing different embodiments of estimating the set of adjusted rainfall values using different digital rainfall models are described in detail in the RAINFALL ESTIMATION TECHNIQUES section herein.

At step 720, the system is programmed to estimate a set of confidence bounds for the set of adjusted rainfall values. In an embodiment, the rainfall confidence bounds generation instructions 181 provide instruction to the agricultural intelligence computer system 130 to calculate a set of confidence bounds based upon the set of adjusted rainfall values. Confidence bounds include an upper and lower limit of a confidence interval. A confidence interval is a range of values that are expected to cover the adjusted rainfall value for a specific geo-location within a certain probability. For example, if the 80% confidence interval for the adjusted rainfall value for a specific geo-location is between 7.5 cm and 10 cm, then it means that the 80% of the time the predicted adjusted rainfall value will be between the interval of 7.5 cm and 10 cm.

In an embodiment, the rainfall confidence bounds generation instructions 181 may be configured to determine confidence bounds based upon a configurable percentage probability. For example, the agricultural intelligence computer system 130 may be programmed to determine confidence bounds that cover 80% of the predictions. Other embodiments may include a different percentage value number. Details describing different embodiments for determining confidence bounds of the set of confidence bounds are described in detail in the RAINFALL ESTIMATION TECHNIQUES section herein.

In an embodiment, the set of confidence bounds for the set of adjusted rainfall values may be aggregated to represent a set of aggregated confidence bounds for a particular time range. For example, if the set of confidence bounds each represent confidence intervals over a 1-hour time period, then the set of aggregated confidence bounds may be an aggregation of multiple confidence bounds for a particular geo-location over a larger time period, such as a 24-hour time period.

In an embodiment, the set of confidence bounds and the set of aggregated confidence bounds may be exported to the user and to agricultural equipment. Confidence bounds exported to the user may be presented in a format so that the user is informed of the estimated rainfall values and their associated confidence intervals for particular geo-locations. Confidence bounds exported to agricultural equipment may be used as input to adjust agricultural tasks that are performed on one or more geo-locations. Details describing exporting and formatting confidence bounds are described in detail in the EXPORTING CONFIDENCE BOUNDS section herein.

4. Rainfall Estimation Techniques

4.1. Rainfall Regression Model Based on Kriging

In an embodiment, a digital rainfall model may be generated using kriging with external drift techniques to create a linear regression model that accounts for spatially correlated residuals, where residuals represent the difference between the observed rainfall values from rain-gauge data and the estimated rainfall value. Kriging is a method of interpolating values of an unobserved location based on available surrounding observed locations. Kriging with external drift is a spatial prediction technique that combines a regression of a dependent variable on auxiliary variables with kriging of the regression residuals.

Figure 8A:
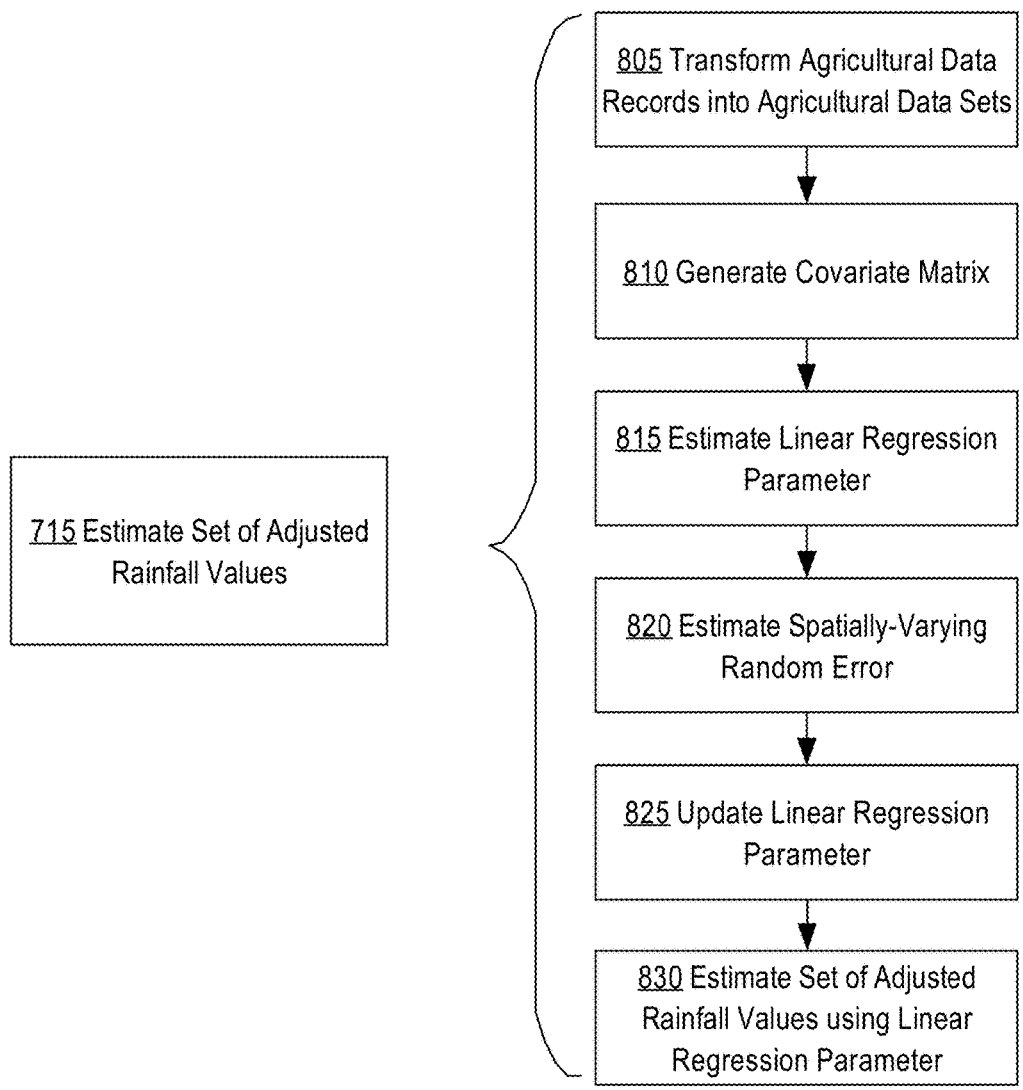
FIG. 8A depicts an example method for estimating a set of adjusted rainfall values using a linear regression model based upon received agricultural data.

FIG. 8A depicts an example method for generating a set of adjusted rainfall values using a digital rainfall model and estimating regression parameters for the digital rainfall model based upon received agricultural data. In an embodiment the digital rainfall model may be implemented using kriging with external drift techniques where the digital rainfall model is a linear regression model that account for spatially correlated residuals. The spatially correlated residuals represent the difference between the observed rainfall value and the estimated rainfall value.

4.1.1. Transforming Data Records

At step 805 the one or more agricultural data sets are transformed into one or more distributions sets. A distribution set may represent a normalized distribution of an agricultural data set. In an embodiment, the rainfall calculation instructions 171 provide instruction to the agricultural intelligence computer system 130 to transform the one or more agricultural data sets into one or more normalized distribution sets.

In an embodiment, the transformation may be implemented using one parameter Box-Cox transformation. One-parameter Box-Cox transformation is a method to transform data that does not follow a normal distribution into a distribution set that more closely follows a normal distribution using exponent value, $\lambda$. The $\lambda$ indicates the power to which the each data value within the set of data is raised. In an embodiment, $\lambda$ may be set as $\lambda=0.3$. Other embodiments may use different values for $\lambda$ including, but not limited to, a value between −5.0 and 5.0. In the scenario where $\lambda=0$, the transformation would then implement a logarithm function, such that each value of z is transformed as, $y(s_i)=\log(z(s_i))$.

In an embodiment, one parameter Box-Cox transformation may be applied to the rain-gauge n-dimensional vector z, where each value of z is transformed using the following:

$$y(s_i) = \frac{z(s_i)^\lambda - 1}{\lambda}$$

where $y(s_i)$ equals the transformed value for $z(s_i)$ and where $\lambda$ equals 0.3.

In an embodiment, one parameter Box-Cox transformation may be applied to the radar data n-dimensional vector w, where each value of $\tilde{w}$ is transformed using the following:

$$x(s_i) = \frac{\tilde{w}(s_i)^\lambda - 1}{\lambda}$$

where $x(s_i)$ equals the transformed value for $\tilde{w}(s_i)$ and $\lambda$ equals 0.3.

In an embodiment, distribution sets for vectors z and w are stored in digital memory of the agricultural intelligence computer system 130. For example, the distribution sets are stored within the model and field data repository 160. In an alternative embodiment, the distribution sets may be stored within digital storage that is external from the agricultural intelligence computer system 130.

4.1.2. Generating Covariate Matrix

Figure 11:
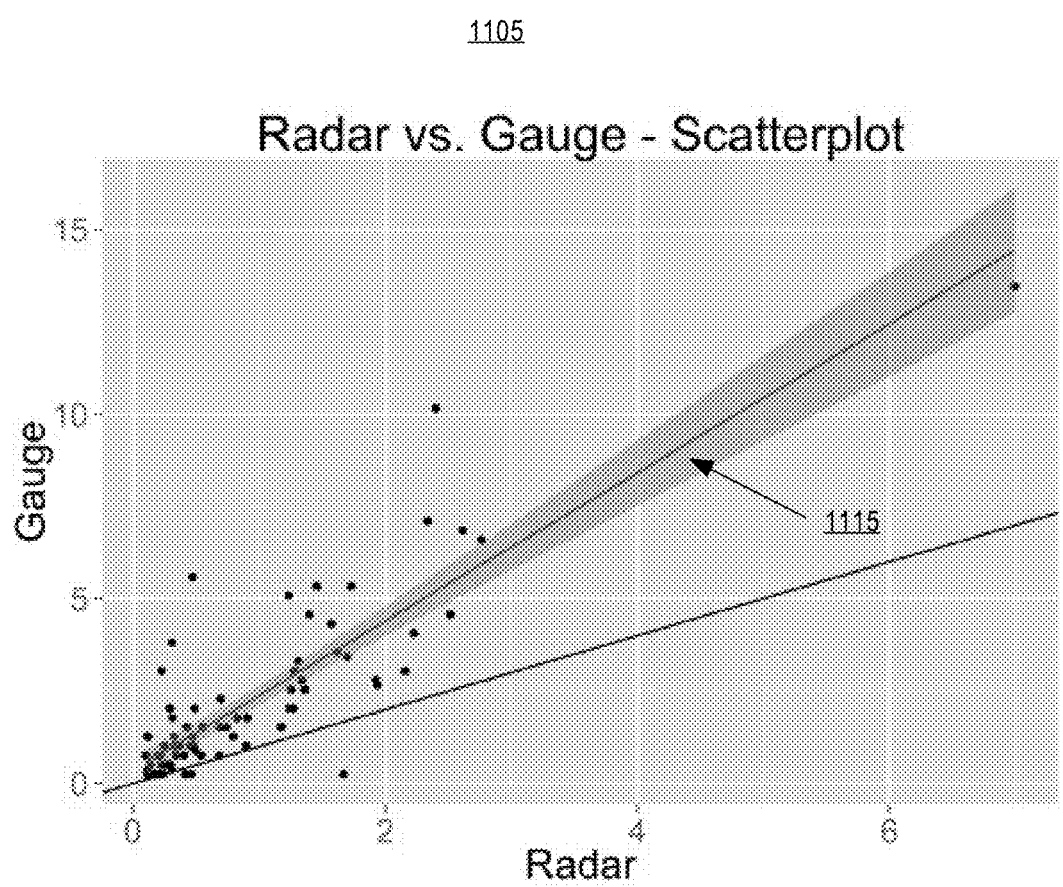
FIG. 11A and FIG. 11B each depict a digital image of rainfall estimations for a specific geographic area.
Figure 11:
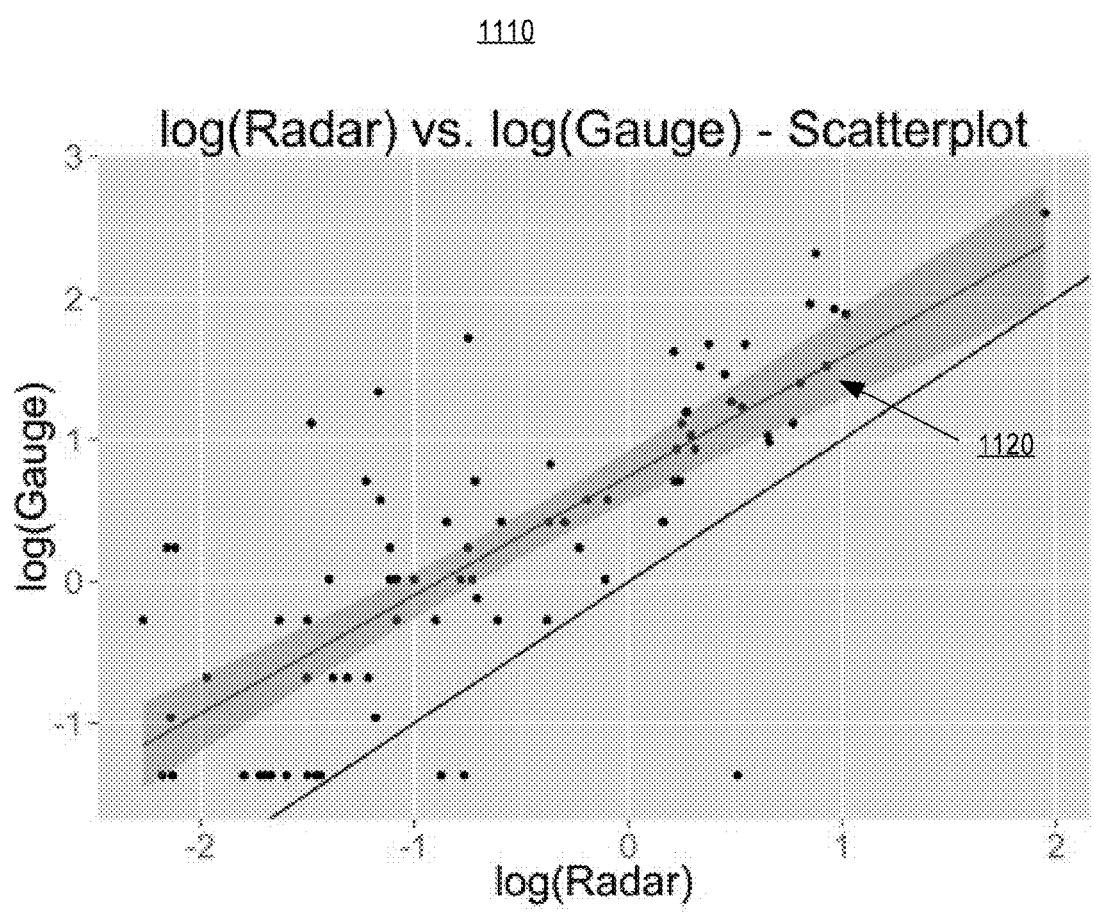

In order to estimate rainfall values for new geo-locations where rainfall data may only exist in the form of radar-derived rainfall data, a correlation between observed rain-gauge data and radar-derived rainfall data must be determined using areas where both types of rainfall data exist. For example, FIG. 11A depicts scatterplot graph plotting observed rain-gauge data versus observed radar-derived rainfall data. Graph 1105 plots rain-gauge observations versus radar-derived observations for a one-hour period. The y-axis represents rain-gauge measurements and the x-axis represents radar-derived measurements for specific geo-locations over the one-hour period. Trend line 1115 attempts to model a linear relationship between the rain-gauge and radar-derived rainfall measurements; however, common statistical assumptions for instance, homogenous errors, are not valid, as larger values of precipitation seem to show larger differences between radar and rain gauge values.

Referring to FIG. 11B, graph 1110 graphs the logarithms of the rain-gauge and radar-derived rainfall measurements, where the y-axis represents the log of the rain-gauge measurements and the x-axis represents the log of the radar-derived measurements for the specific geo-locations over the one hour period. Trend line 1120 shows a linear relationship between the log of the rain-gauge data and the log of the radar-derived data. Specifically, the trend line 1120 shows that the linear relationship includes an additive bias, where the log values of the rain-gauge data about one value higher than the log values of the radar-derived data for each observed geo-location. Therefore, using this example, the logarithms of rain-gauge data versus the logarithms of radar-derived data show a linear relationship with additive bias.

In an embodiment, a covariate matrix may be generated in order to model the rain-gauge and radar-derived data. At step 810, covariate matrix generation instructions 172, provide instruction to the agricultural intelligence computer system 130 to generate a covariate matrix from the one or more distribution data sets and store the generated covariate matrix in digital memory within the agricultural intelligence computer system 130. For example, a covariate matrix X may be created using values from the distribution sets for vector w, where the covariate matrix X is an n×2 matrix of covariates, such that the first column of the n×2 matrix is a vector of ones and the second column of the n×2 matrix is the radar-derived data for observed geo-locations. The vector of ones corresponds to the first element of the 2-dimensional vector β corresponding to the intercept of the linear regression model, described herein.

4.1.3. Generating Rainfall Regression Model

Regression modeling may be used to predict a correlation between radar-derived data and rain-gauge data. The generated covariate matrix X and the distribution set for vector z (transformed rain-gauge data) may be used to create a regression model that models the relationship between radar-derived data and rain-gauge data. In an embodiment, residuals within a regression model may be influenced by residual values that are within a specific spatial proximity to each other. For this reason, kriging with external drift techniques may be used to create a linear regression model that accounts for spatially correlated residuals.

In an embodiment, the digital rainfall regression model is a kriging with external drift regression model that may be represented as:

$$y = X\beta + \eta + \varepsilon$$

where:

y is the n-dimensional vector that represents the transformed rain-gauge data, z.

X is the stored n×2 covariate matrix, where the first column is a vector of ones and the second column is the transformed radar-derived data.

β is a 2-dimensional vector where the first element represents the additive bias between the logarithm of the rain-gauge data and the logarithm of the radar-derived data, and the second element represents the multiplicative bias between the logarithm of the rain-gauge data and the logarithm of the radar-derived data.

ε is an error term calculated using a normal distribution, $\varepsilon \sim N(0_n, \sigma^2 I_n)$ where subscript n refers to the row size of the covariate matrix X, $I_n$ is an identity matrix, and $\sigma^2$ represents the nugget effect variance that accounts for measurement error and small-scale spatial variation.

η is an n-dimensional vector of spatially-varying random error with multi-variate normal distribution. In an embodiment, n-dimensional vector η may be represented as a distribution:

$$\eta \sim N(0_n, \tau^2 R_\rho)$$

where:

$\tau^2$ is the partial sill parameter, and ρ is the spatial range parameter where:

$$[R_\rho]_{ij} = \exp\{-\|s_i - s_j\|/\rho\}$$

where $R_\rho$ is an n×n matrix, and $[R_\rho]_{ij}$ represents the element in the ith column and jth row. $R_\rho$ is used to model correlations between nearby observations such that the closer $s_i$ and $s_j$ are to each other the more highly correlated the ith and jth entries of the n-dimensional vector η will be. The further apart $s_i$ and $s_j$ are to each other, the closer $R_\rho$ approaches zero and does not have any effect on n-dimensional vector η.

In an embodiment, the digital rainfall regression model may be rewritten as:

$$y \sim N(X\beta, \Sigma(\theta))$$

where $\theta = (\tau^2, \sigma^2, \rho)$ and $\Sigma(\theta) = \sigma^2 I_n + \tau^2 R_\rho$.

Steps for generating the digital rainfall regression model are described in 815, 820, and 825. In an alternative embodiment, a previously generated and stored digital rainfall regression model using historical agricultural data may be used to estimate adjusted rainfall values. The rainfall estimation instructions 174 provide instruction to estimate adjust rainfall values using a previously generated digital rainfall regression model that has been store in the model and field data repository 160. If a previously generated digital rainfall regression model is used then the agricultural intelligence computer system 130 may proceed to step 830, as described herein.

In an embodiment, regression parameters are estimated for the digital rainfall regression model using the covariate matrix. In an embodiment, the parameter estimation regression instructions 173 provide instruction to the agricultural intelligence computer system 130 to estimate regression parameters for the digital rainfall regression model using restricted maximum likelihood estimation techniques. Restricted maximum likelihood is a technique by which estimating parameters is accomplished by replacing an observed set of data with a set of contrast matrices calculated from the observed set of data. The likelihood function is then calculated from the probability distribution of the contrast matrices.

In an embodiment, the multiple parameters of the digital rainfall regression model may be estimated using restricted maximum likelihood, where the 2-dimensional vector β is initially estimated assuming that the digital rainfall regression model is a simple linear regression with independent errors. After initially estimating the 2-dimensional vector β, coefficient θ may be estimated by estimating the likelihood of linearly independent contrasts.

Steps 815, 820, and 825 depict a detailed example of estimating regression parameters and spatially varying random error values for the digital rainfall regression model using restricted maximum likelihood. At step 815, the linear regression parameters in β are estimated by assuming that the residuals are independent errors. In an embodiment, the digital rainfall regression model is assumed to have independent errors by treating residuals "η+ε" as a single residual value u, such that the assumed linear regression model may be represented as:

$$y = X\beta + u$$

where u represents "η+ε".

After estimating the linear regression parameters in β, parameter θ may be estimated using the estimated the linear regression parameters in β. At step 820, parameter θ is estimated using restricted maximum likelihood and derived linearly independent contrasts from estimated linear regression parameter β. In an embodiment, θ may be estimated by deriving ũ using linearly independent contrasts based upon the linear regression parameter β, such that:

$$\tilde{u} = (I_n - X(X^T X)^{-1} X^T) y$$

where the distribution of ũ does not depend on β. In an embodiment, since X is a n×2 covariate matrix, the linearly independent contrasts, with restricted degrees of freedom result in a singular multivariate distribution for ũ.

In an embodiment, parameter θ is estimated using the maximum likelihood function using the distribution for ũ such that:

$$l(\theta; \tilde{u}) = -\frac{n-p}{2}\log(2\pi) - \frac{1}{2}\log\det\{\Sigma\} - \frac{1}{2}\log\det\{M\} - \frac{1}{2}\tilde{u}^T\{\Sigma^{-1} - \Sigma^{-1} X M^{-1} X^T \Sigma^{-1}\}\tilde{u}$$

where $l(\theta; \tilde{u})$ is the function for determining the maximum likelihood for parameter θ, $M = X^T \Sigma^{-1} X$, and $\Sigma^{-1}$ represents $\Sigma(\theta)^{-1}$.

At step 825, the estimated maximum likelihood of parameter θ is then used to update the estimated value for the linear regression parameters in β. Since β was initially estimated under the assumption that the residuals were independent of each other, β must be re-estimated to account for the spatially varying random error values using the estimated parameter θ. In an embodiment, the projected linear regression parameter $\hat{\beta}$ may be estimated based upon the maximized likelihood of parameter θ as:

$$\hat{\beta}=(X^T\hat{\Sigma}^{-1}X)^{-1}X^T\hat{\Sigma}^{-1}y$$

where $\hat{\Sigma}=\hat{\sigma}^2 I_n + \hat{\tau}^2 R_{\hat{\rho}}$.

In an embodiment, the digital rainfall regression model may be stored in the model and field data repository 160. The regression parameters estimated for the digital rainfall model for the given geo-locations may be used to estimate adjusted rainfall values for future rainfall measurements associated with the given geo-locations.

4.1.4. Estimating Adjusted Rainfall Values

At step 830, adjusted rainfall values are estimated for the set of geo-locations received at step 705 from FIG. 7. In an embodiment, if a previously generated digital rainfall regression model is used, then the covariate matrix created at step 810 is represented as X* and the n-dimensional vector that represents the transformed rain-gauge data, z is represented as y*.

If however, the digital rainfall regression model is based upon radar data and rain-gauge data pairs received at step 705, then the covariate matrix X* represents all of the agricultural data for geo-locations received at step 705, which may include geo-locations that do not have both radar data and rain-gauge pairs. Therefore the set of geo-locations may include at least some geo-locations not previously modeled by the digital rainfall regression model, some values within the y* distribution set may be null. In an embodiment, covariate matrix X* may include null values for the additive bias between the rain-gauge data and the radar-derived data if the specific geo-location does not include any rain-gauge data.

In an embodiment, the rainfall estimation instructions 174 provide instructions to estimate adjusted rainfall values for the set of geo-locations using the digital rainfall regression model and the transformed distribution sets for the set of geo-locations. A joint distribution may be determined using the "y" distribution set used to create the digital rainfall regression model and a y* distribution set generated from the set of geo-locations. If a previously generated digital rainfall regression model is used, then the y* distribution set refers to agricultural data received at step 705 from FIG. 7.

In an embodiment the joint distribution is a multivariate normal distribution with cross-covariances:

$$cov(y^*,y)=\Sigma^*$$

where cov(y*, y) is a function of the relationship between existing locations that make up y and the new locations that make up y*.

The expectations for each y and y* are represented as:

$$E(y)=X\hat{\beta}$$

$$E(y^*)=X^*\hat{\beta}$$

In order to estimate the adjusted rainfall for the new geo-locations based upon conditions from the existing geo-locations, for which rain-gauge data exists, the conditional expectation is a deterministic function of θ. Therefore the mean predictions of adjusted rainfall values may be modeled as a multivariate normal distribution with conditional expectation:

$$E(y^*|y)=X^*\hat{\beta}+\Sigma^*\Sigma^{-1}(y-X\hat{\beta})$$

Additionally, estimations that are specific to new locations include an estimation of uncertainty as a function of the covariances:

$$cov(y^*|y)=\Sigma^{**}+\Sigma^*\Sigma^{-1}\Sigma^{*T}$$

where:
$\Sigma^{**}$ is the covariance function between new locations y*, as $cov(y^*, y^*)=\Sigma^{**}$
$\Sigma^{*T}$ is the transpose of $\Sigma^*$.

In an embodiment, estimated adjusted rainfall values may be stored in the model and field data repository for future estimation purposes and/or for presentation purposes to the user.

4.1.5 Determining Confidence Bounds

In an embodiment, the confidence bounds generation instructions 181 program the agricultural intelligence computer system 130 to estimate a set of confidence bounds for the set of estimated adjusted rainfall values. Referring back to FIG. 7, at step 720 a set of confidence bounds are estimated using the covariance function $\Sigma^{**}$ generated at step 830 and mean predictions of adjusted rainfall values for the set of geo-locations. The covariance function yields a prediction location covariance matrix of the set of geo-locations.

Figure 8B:
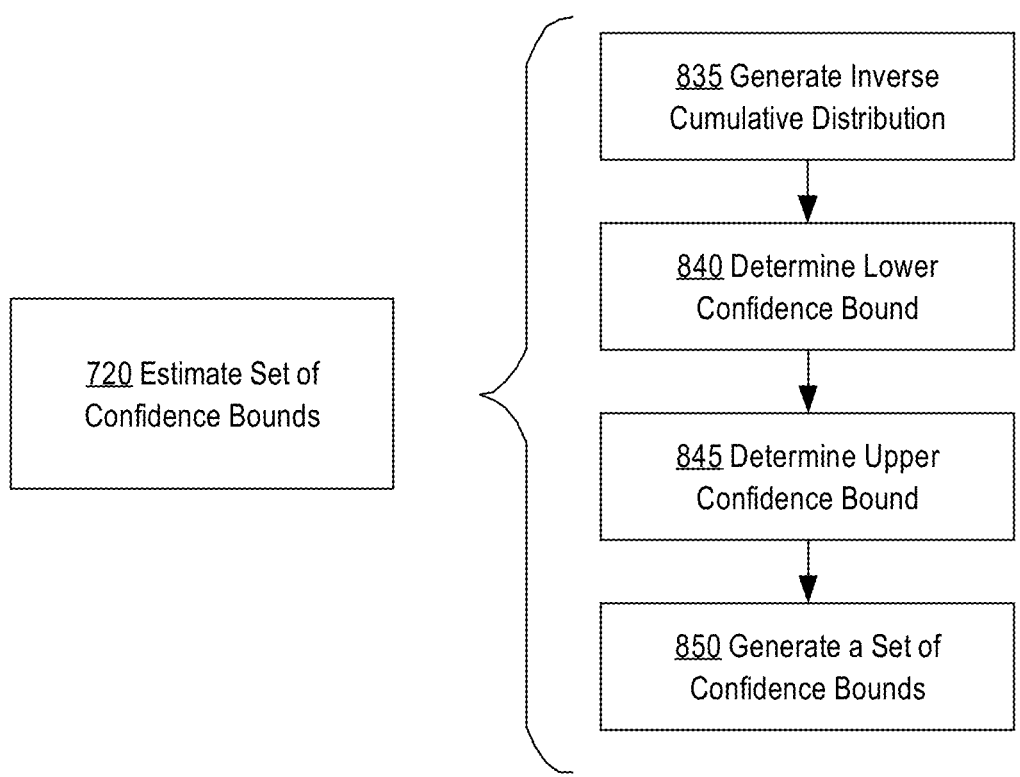
FIG. 8B depicts an example method for estimating a set of confidence bounds using the using a covariance matrix of agricultural data and mean predictions of adjusted rainfall values for the set of geo-locations.

In an embodiment, the system is programmed on the basis that the probability densities at each prediction location within the prediction location covariance matrix are normally distributed. FIG. 8B depicts an example method for determining a set of confidence bounds using the using the prediction location covariance matrix and the mean predictions of adjusted rainfall values for the set of geo-locations. At step 835, an inverse cumulative distribution function is generated to determine interval values that comprise the upper and lower confidence bounds. In an embodiment, a normal probability distribution is generated using the mean values of the adjusted rainfall values and variance values calculated from the prediction location covariance matrix. In an embodiment, the variance values may be selected as the diagonal of the prediction covariance matrix.

In an embodiment, the inverse cumulative distribution function is a function that determines for a given probability a certain value, from the generated normal probability distribution, that is less than or equal to the desired probability. For example, if the generated normal probability distribution yields a mean adjusted rainfall value x, then the inverse cumulative distribution function may be used to determine an adjusted rainfall value, from the generated normal probability distribution, that has a desired probability. For instance, the inverse cumulative distribution function may be used to determine the value at which all values less than or equal to the value have a 25% probability of being the adjusted rainfall value.

In an embodiment, the confidence bounds generation instructions 181 may specify interval values to determine the desired confidence bound. Interval values may be configurable depending upon the size of the interval desired. For example, the confidence bounds generation instructions 181 may be configured to determine interval values at the $10^{th}$ and $90^{th}$ percentiles, where the lower confidence bound specifies the lower bound for the interval between the $10^{th}$ and $90^{th}$ percentiles and the upper confidence bound specifies the upper bound for the desired interval. In another example the interval values may be configured to specify interval values of the $25^{th}$ and $75^{th}$ percentiles. In yet other examples, the interval values may be configured to any other set of lower and upper values.

At step 840, the lower confidence bound is determined using the inverse cumulative distribution function. For example, if the confidence intervals are set to the $10^{th}$ and $90^{th}$ percentiles, then the lower confidence bound is determined using the inverse cumulative distribution function where the percentile parameter is 10 percent. In an embodiment, the inverse cumulative distribution function yields a 10 percent adjusted rainfall value, where a set of adjusted rainfall values, that are less than or equal to the 10 percent adjusted rainfall value, have only a 10% probability of including the actual rainfall value.

At step 845, the upper confidence bound is determined using the inverse cumulative distribution function. Using the above example of confidence intervals, then the upper confidence bound is determined using the inverse cumulative distribution function where the percentile parameter is 90 percent. In an embodiment, the inverse cumulative distribution function yields a 90 percent adjusted rainfall value, where a set of adjusted rainfall values, that are less than or equal to the 90 percent adjusted rainfall value, have a 90% probability of including the actual rainfall value.

At step 850, a set of confidence bounds that correspond to the set of geo-locations is compiled. In an embodiment, the set of confidence bounds includes value pairs that define a lower confidence bound and an upper confidence bound associated with each adjusted rainfall value for each geo-location in the set of geo-locations. The lower confidence bound in the value pair refers to the value determined at step 845 and the upper confidence bound refers to the value determined at step 850, such that together the lower confidence bound and the upper confidence bound define the boundaries for the confidence interval for the specific adjusted rainfall value. In an embodiment, the sets of value pairs that make up the set of confidence bounds are each associated with the adjusted rainfall values for each geo-location, such that (lower value, upper value)$_{i,j}$ where i, j is the geo-location for the adjusted rainfall value associated with the value pair.

4.2. Mean Field Bias

In an embodiment, adjusted rainfall values may be calculated using mean field bias correction methods. Mean field bias correction methods assume that there is a multiplicative error between two different types of observations. In the current embodiment, the multiplicative error assumed is between observed rain-gauge data and observed radar data. The observed radar data is adjusted by first calculating a correction factor based upon geo-locations that have both rain-gauge and radar observations. The observed radar data is then adjusted by multiplying each radar observation by the correction factor to produce adjusted radar data for each geo-location.

4.2.1. Estimating Rainfall Values Using Correction Factor

Figure 9:
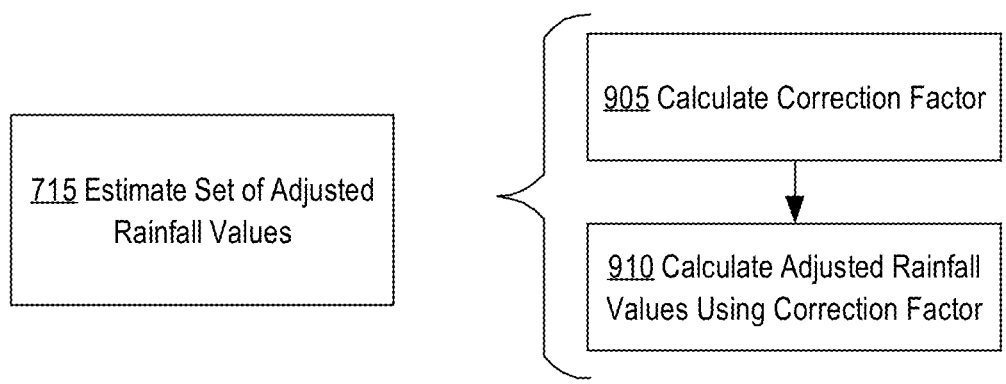
FIG. 9A depicts an example method for estimating adjusted rainfall values for a set of geo-locations using mean field bias correction on the received agricultural data.
FIG. 9B depicts an example method for estimating confidence bounds for the set of geo-locations using bootstrapping on received agricultural data.
FIG. 9C depicts an example method for estimating confidence bounds for the set of geo-locations using kernel density estimation on received agricultural data.
Figure 9:
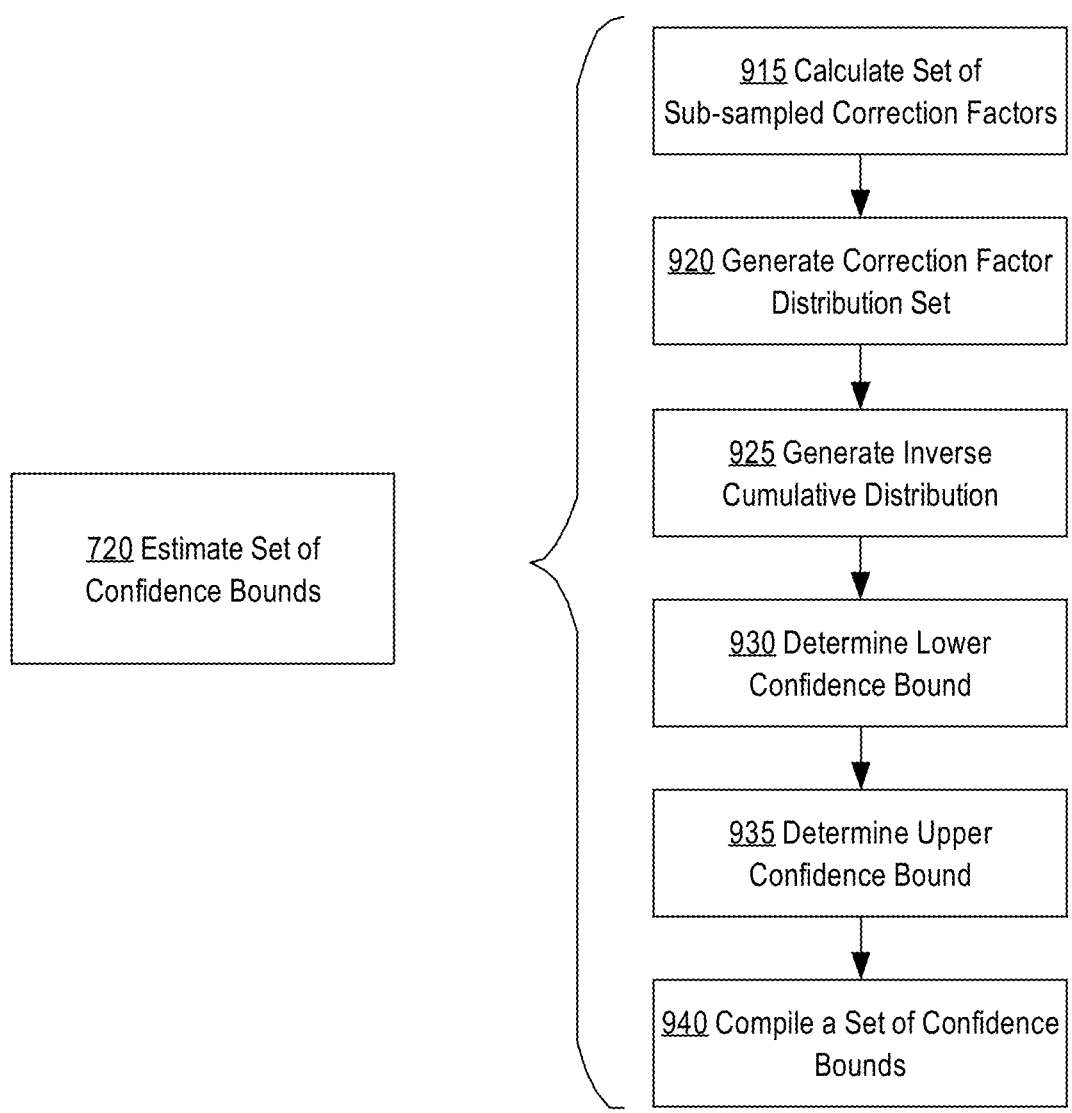
Figure 9:
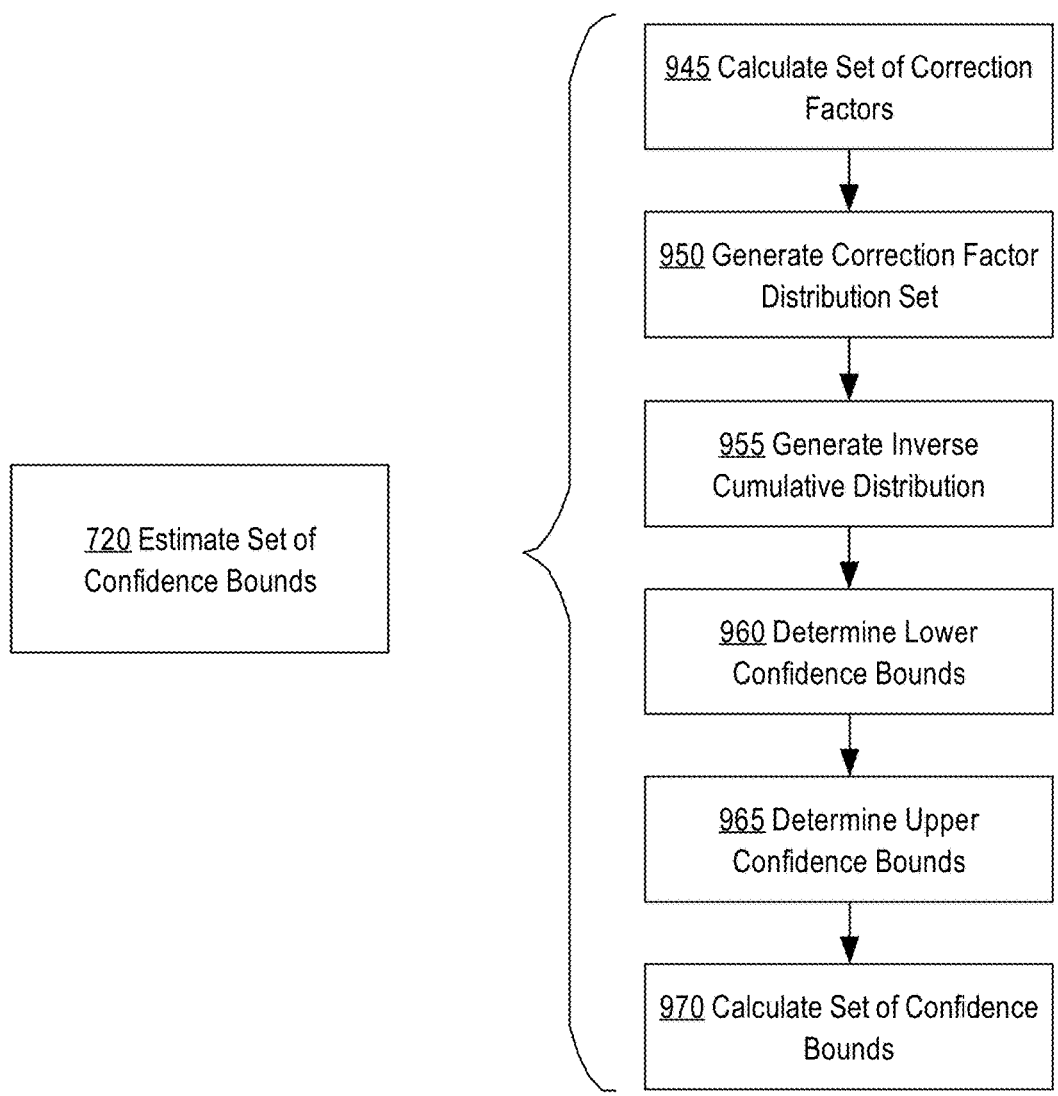

FIG. 9A depicts a detailed example of calculating adjusted rainfall values using mean field bias correction. At step 905 the mean field bias correction factor is determined. In an embodiment, the rainfall estimation instructions 174 provide instruction to calculate a correction factor between observed rain-gauge and observed radar data for a set of geo-locations, where both observed rain-gauge data and radar data exist. The correction factor is calculated as the sum of rain-gauge observations divided by the sum of radar data for the set of geo-locations, such that:

$$CF = \frac{\sum_{i=1}^{N} (gauge_i)}{\sum_{i=1}^{N} (radar_i)}$$

where CF is the calculated correction factor, $gauge_i$ is the observed rain-gauge value at geo-location i, $radar_i$ is the observed radar data value at geo-location i, and N is the total number of geo-locations in the set of geo-locations that have both observed rain-gauge and radar data.

At step 910 the set of adjusted rainfall values are calculated using the calculated correction factor. In an embodiment, the rainfall estimation instructions 174 provide instruction to generate the set of adjusted rainfall values by multiplying the set of observed radar data by the correction factor. For each geo-location where observed radar data exists, adjusted rainfall values are calculated as:

$$radar_{new,i} = CF * radar_i$$

where $radar_{new,i}$ represents the adjusted rainfall value at geo-location i.

4.2.2. Determining Confidence Bounds

In an embodiment, confidence bounds for the adjusted rainfall values calculated using mean field bias correction may be generated using methods including, but not limited to, bootstrapping and kernel density estimation. Bootstrapping is a method for generating a distribution for an estimated value by using random sampling. Random sampling may include, but is not limited to, subsampling where an estimated value is determined from a subsample of the total dataset. Subsampling repeated over several different subsamples may be used to generate a representative distribution set for the dataset.

FIG. 9B depicts an example embodiment of determining confidence bounds for the set of geo-locations, where both observed rain-gauge data and radar data exists, using bootstrapping. At step 915 a set of subsampled correction factors is generated. In an embodiment, subsamples of rain-gauge and radar data pairs are generated. For example, sets of N rain-gauge-to-radar data samples are subsampled to produce a set of N correction factors. The N correction factors are calculated using the method described in step 905. Subsampling of the N rain-gauge-to-radar data samples may be selected based upon observed data using one hour increments. In an embodiment, subsampling may be performed several thousand times to produce a set of subsampled correction factors.

At step 920, a distribution set is generated using the set of subsampled correction factors. In an embodiment, the distribution set of subsampled correction factors may be used to determine confidence intervals.

At step 925, confidence bounds are generated by taking percentiles (e.g., the 10th and 90th) of the distribution set. In an embodiment, the inverse cumulative distribution function may generate interval values for the distribution set of correction factors. The confidence bounds generation instructions 181 may specify interval values to determine the desired confidence bound. For example, the confidence bounds generation instructions 181 may be configured to determine interval values at the $10^{th}$ and $90^{th}$ percentiles, where the lower confidence bound specifies the lower bound for the interval between the $10^{th}$ and $90^{th}$ percentiles and the upper confidence bound specifies the upper bound for the desired interval.

At step 930, the lower confidence bound is determined. For example, if the confidence intervals are set to the 10$^{th}$ and 90$^{th}$ percentiles, then the lower confidence bound is determined where the percentile parameter is 10 percent.

At step 935, the upper confidence bound is determined using the inverse cumulative distribution function. Using the above example of confidence intervals, then the upper confidence bound is determined using the inverse cumulative distribution function where the percentile parameter is 90 percent.

At step 940, a set of confidence bounds that correspond to the set of geo-locations is compiled. In an embodiment, the set of confidence bounds includes sets of value pairs that define a lower confidence bound and an upper confidence bound associated with each adjusted rainfall value for each geo-location in the set of geo-locations. The lower confidence bound in the value pair refers to the value determined at step 930 and the upper confidence bound refers to the value determined at step 940, such that together the lower confidence bound and the upper confidence bound define the boundaries for the confidence interval for the specific adjusted rainfall value.

In an alternative embodiment, confidence bounds for the adjusted rainfall values calculated using mean field bias correction may be generated using kernel density estimation. Kernel density estimation is a non-parametric method for estimating the probability density function of a random variable. The kernel density estimation is used to estimate the shape of a distribution that is based upon a finite set of data points. In the current context the kernel density estimation is used to determine the shape of the distribution of correction factors for the rain-gauge-to-radar data samples for the given set of geo-locations. In an embodiment the kernel density estimation for a given sample may be represented as:

$$\hat{f}_h(x) = \frac{1}{n}\sum_{i=1}^{n} K_h(x - x_i)$$

where:

($x_1, x_2, \ldots, x_n$) is a sample drawn from the correction factors determined as calculated ratios of rain-gauge-to-radar data at specific geo-locations.

K is the kernel, which is a non-negative function that integrates to one and has a mean of zero.

h is a smoothing parameter, called bandwidth. The bandwidth is an estimated parameter, which exhibits a strong influence on the shape of the estimate.

FIG. 9C depicts an example method for using kernel density estimation to determine confidence bounds. At step 945, a set of correction factors are generated based on rain-gauge-to-radar data samples for the given set of geo-locations. In an embodiment the each correction factor in the set of correction factors is determined as a ratio of rain-gauge data over radar data for a given geo-location.

At step 950, a correction factor distribution set is generated using kernel density estimation to determine the shape of the correction factor distribution set. In an embodiment, the kernel density estimation function implements a Gaussian function. When implementing a Gaussian function, the bandwidth may be calculated using Silverman's rule of thumb. Alternative embodiments, may implement other functions to determine the bandwidth. Silverman's rule of thumb is a bandwidth function that may be used to determine the optimal level of smoothing for a Gaussian function. Under Silverman's rule the bandwidth is calculated as:

$$h = \frac{4\hat{\sigma}^{5^{0.2}}}{3N}$$

where $\hat{\sigma}$ is a sample standard deviation and N is the sample size.

At step 955, an inverse cumulative distribution function is generated from the correction factor distribution set. In an embodiment, the inverse cumulative distribution function may generate interval values for the correction factor distribution set. The confidence bounds generation instructions 181 may specify interval values to determine the desired confidence bound. In an embodiment, the confidence bounds generation instructions 181 may be configured to determine interval values at the 10$^{th}$ and 90$^{th}$ percentiles, where the lower confidence bound specifies the lower bound for the interval between the 10$^{th}$ and 90$^{th}$ percentiles and the upper confidence bound specifies the upper bound for the desired interval.

At step 960, the lower confidence bound is determined using the inverse cumulative distribution function. For example, if the confidence intervals are set to the 10$^{th}$ and 90$^{th}$ percentiles, then the lower confidence bound is determined using the inverse cumulative distribution function where the percentile parameter is 10 percent.

At step 965, the upper confidence bound is determined using the inverse cumulative distribution function. Using the above example of confidence intervals, then the upper confidence bound is determined using the inverse cumulative distribution function where the percentile parameter is 90 percent.

At step 970, a set of confidence bounds that correspond to the set of geo-locations is compiled. In an embodiment, the set of confidence bounds includes sets of value pairs that define a lower confidence bound and an upper confidence bound associated with each adjusted rainfall value for each geo-location in the set of geo-locations. The lower confidence bound in the value pair refers to the value determined at step 960 and the upper confidence bound refers to the value determined at step 965, such that together the lower confidence bound and the upper confidence bound define the boundaries for the confidence interval for the specific adjusted rainfall value.

4.3. Gamma Distribution with Copula

In an embodiment, adjusted rainfall values may be calculated using a Gaussian copula approach for estimating distributions from rain-gauge and radar observations for a set of geo-locations. Gaussian copula is a multivariate distribution whose marginal distributions are uniform. Uniform marginal distributions refer to probability distributions for subsets of rain-gauge and radar observations that have a constant probability.

4.3.1. Estimating Rainfall Values Using Gaussian Copula

Figure 10:
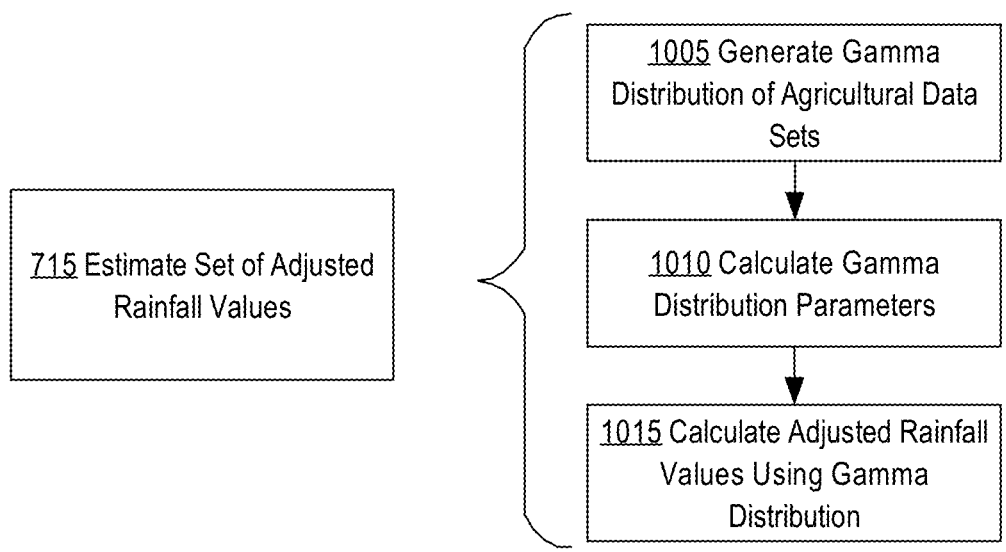
FIG. 10A depicts an example method for estimating a set of adjusted rainfall values for the set of geo-locations using Gaussian copula on received agricultural data.
FIG. 10B depicts an example of determining a set of confidence bounds using conditional distributions generated from applied Gaussian copula on received agricultural data.
Figure 10:
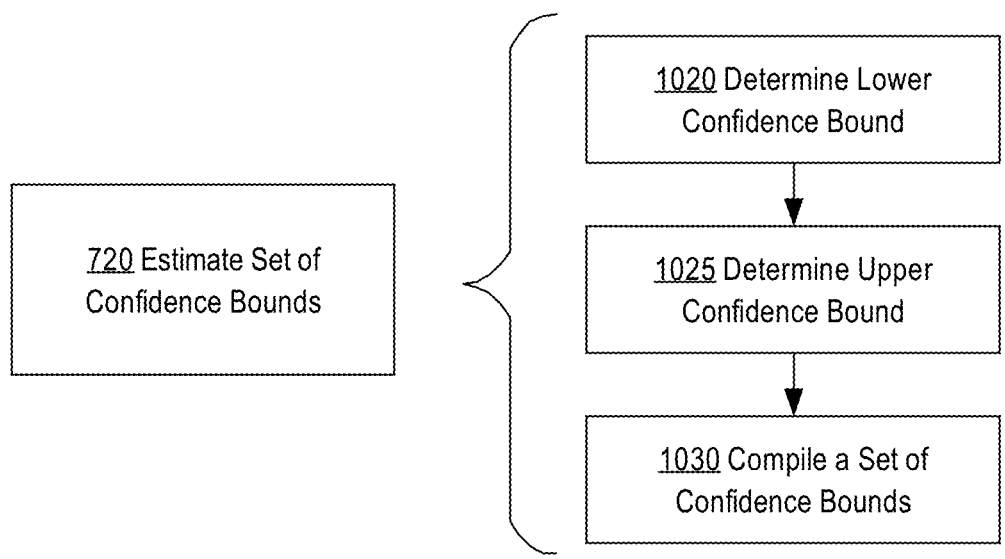

FIG. 10A depicts an example of estimating the set of adjusted rainfall values for the set of geo-locations using Gaussian copula. At step 1005, a joint cumulative distribution for rain-gauge and radar observations for a set of geo-locations are generated, where the joint cumulative distribution represents a multivariate distribution. In an embodiment, the rainfall confidence bounds generation instructions 181 provide instruction to generate the joint cumulative distribution based upon the set of known geo-locations that contain both rain-gauge and radar observations. In an embodiment, a marginal distribution may be generated for each geo-location based upon the rain-gauge and radar observations. The joint cumulative distribution is a multivariate distribution made up of a set of marginal distributions. For instance, the joint cumulative distribution may be generated using a joint cumulative distribution function:

$$F(X_1, \ldots, X_N) = C(F_1(X_1), \ldots, F_N(X_N))$$

where $F_i$ is the marginal cumulative distribution for a specific geo-location $X_i$.

At step 1010, joint cumulative distribution parameters are determined based upon the set of marginal distributions. In an embodiment, shape and scale parameters are fitted to the rain-gauge and radar data. Shape and scale parameters are determined based upon the distribution generated from step 1005.

At step 1015, adjusted rainfall values for a set of geo-locations may be determined from predicted conditional distributions for specific geo-locations based upon the joint cumulative distribution. In an embodiment, a predicted conditional distribution may be generated from a copula density function. Copula density provides a relative likelihood that a prediction for a given geo-location is the value predicted. The copula density function may be used to predict conditional distributions of adjusted rainfall values for new geo-locations given only rain-gauge or radar data. Referring back to the joint cumulative distribution function, the copula density may be determined as a derivative of C. The copula density may be represented as:

$$c_\Sigma(u_i) = \frac{1}{\sqrt{|\Sigma|}} \exp\left(-\frac{1}{2} \begin{pmatrix} \Phi^{-1}(u_1) \\ \ldots \\ \Phi^{-1}(u_N) \end{pmatrix}^T * (\Sigma^{-1} - I) * \begin{pmatrix} \Phi^{-1}(u_1) \\ \ldots \\ \Phi^{-1}(u_N) \end{pmatrix}\right)$$

where:

$u_i = F(X_i)$ equals the conditional distribution at given a given geo-location given the rain-gauge data.

$\Sigma$ is a correlation matrix of the rain-gauge and radar data observations for the set of geo-locations.

$\Phi^{-1}$ is the inverse cumulative distribution function of a univariate Gaussian.

In an embodiment, adjusted rainfall values may be determined from the conditional distributions that correspond to the set of target geo-locations.

4.3.2. Determining Confidence Bounds

In an embodiment, confidence bounds for adjusted rainfall values may also be determined using the conditional distributions generated from the copula density function. Probabilities from conditional distributions may be used to determine an upper and lower bounds for a desired confidence level. FIG. 10B depicts an example of determining a set of confidence bounds using the conditional distributions generated from step 1015. At step 1020, the lower confidence bound is determined based upon the conditional distribution for that specific geo-location. For example, if the confidence intervals are set to the $10^{th}$ and $90^{th}$ percentiles, then the lower confidence bound is determined using the inverse cumulative distribution function where the percentile parameter is 10 percent.

At step 1025, the upper confidence bound is determined based upon the conditional distribution for that specific geo-location. Using the above example of confidence intervals, then the upper confidence bound is determined using the inverse cumulative distribution function where the percentile parameter is 90 percent.

At step 1030, a set of confidence bounds that correspond to the set of geo-locations is generated. In an embodiment, the set of confidence bounds includes sets of value pairs that define a lower confidence bound and an upper confidence bound associated with each adjusted rainfall value for each geo-location in the set of geo-locations. The lower confidence bound in the value pair refers to the value determined at step 1020 and the upper confidence bound refers to the value determined at step 1025, such that together the lower confidence bound and the upper confidence bound define the boundaries for the confidence interval for the specific adjusted rainfall value.

5. Exporting Confidence Bounds 5.1. Aggregating Confidence Bounds

Adjusted rainfall values and their corresponding confidence bounds for a set of geo-locations represent an estimated range of rainfall over a specific time period. The specific time period may be based upon the type of agricultural data used and the frequency upon which it is received. For example, if the rain-gauge and radar data are received as hourly observations, then the adjusted rainfall values and associated confidence bounds would represent an estimated range of rainfall for specific hourly periods.

In an embodiment, confidence bounds representing specific time periods may be aggregated to represent larger time periods. For example, hourly confidence bounds for specific geo-locations may be aggregated to a 24-hour period. By doing so, the agricultural intelligence computer system 130 may: provide daily confidence bounds to users as daily rainfall information, format and export daily confidence bounds to programmable farming equipment for the purposes of determining watering strategies, and/or compare daily confidence bounds to externally available daily information for validation purposes. Aggregation techniques for aggregating confidence bounds that represent different time periods may include, but are not limited to, a summation of confidence bounds over periods of time and an addition of uncertainty over periods of time.

In an embodiment, confidence bounds aggregation instructions 182 provide instruction to the agricultural intelligence computer system 130 to generate an aggregation of confidence bounds as a summation of confidence bounds for selected time periods for specific geo-locations. Using a summation technique the lower and upper confidence bounds are calculated by summing the lower and upper confidence bounds from the set of confidence bounds for a specific geo-location over a specified time period. For example, a lower aggregated confidence bound for a 24-hour period may be calculated as the sum of the individual hourly lower confidence bounds calculated for that specific geo-location. An upper aggregated confidence bound for the 24-hour period for that specific geo-location may be calculated as the sum of the hourly upper confidence bounds calculated for that specific geo-location.

In other embodiments, aggregated confidence bounds may be configured to represent any aggregated time duration. Additionally the individual confidence bounds used to calculate the aggregated confidence bounds may include different time durations.

In an embodiment, a set of aggregated confidence bounds may be calculated for a set of geo-locations based upon the hourly confidence bounds for each of the geo-locations in the set of geo-locations.

In another embodiment, confidence bounds aggregation instructions 182 provide instruction to the agricultural intelligence computer system 130 to generate an aggregation of confidence bounds as based upon the addition of uncertainty over periods of time represented by the calculated confidence bounds. For example, if the calculated confidence bounds each represent a 1-hour observation of rainfall for a specific geo-location, then the aggregated confidence bounds may represent an aggregated 24-hour period that is calculated from the uncertainty from each of the 1-hour observations of confidence bounds for a specific geo-location. The addition of uncertainty may be calculated as the square root of the sum of the uncertainties squared of the 1-hour observations of confidence bounds. The addition of uncertainty may be represented as:

$$\Delta x = \sqrt{(\Delta x_1)^2 + \ldots + (\Delta x_{24})^2}$$

where:

$\Delta x_1, \ldots, \Delta x_{24}$ each represent a the uncertainty, measured as the standard deviation, for a specific hour within a 24-hour time period.

$\Delta x$ represents the aggregation of the hourly uncertainties, $\Delta x_i, \ldots, \Delta x_{24}$.

5.2. Exporting and Presenting Confidence Bounds

Calculated confidence bound values may be presented to a user, external farming equipment, or internal processes. In an embodiment, calculated confidence bounds and/or aggregated confidence bounds may be presented to the user in either a numeric form or a graphic representation in a computer display. In an embodiment, the presentation layer 134 may send, via the network, a set of confidence bounds that represent a set of geo-locations, in numeric form, to the field manager computer device 104 with instructions for display. In another embodiment, the presentation layer 134 may send the set of confidence bounds, in the form of one or more graphical representations, to the field manager computer device 104 with instructions for display. Graphical representations may include, but are not limited to, a point graph with error bars representing the upper and lower confidence bounds, a graphical representation of the geo-locations with overlaid rainfall estimations and confidence bounds, and a histogram representing the distribution of the adjusted rainfall estimations including markers showing the upper and lower confidence bounds.

In an embodiment, calculated confidence bounds may be formatted to an exportable data format that is compatible with agricultural apparatus 111 (FIG. 1) for use in managing, configuring or controlling that equipment. The agricultural apparatus 111 may include tractors, combines, harvesters, planters, trucks, fertilizer equipment, unmanned aerial vehicles, and any other item of physical machinery or hardware, typically mobile machinery, and which may be used in tasks associated with agriculture. The agricultural apparatus 111 may include an attached computer system that is configured to program automatic tasks associated with agriculture. For example, the agricultural apparatus 111 may represent a field watering system with an attached computer system configured to schedule and regulate watering times and duration. In an embodiment, the presentation layer 134 may format and send the calculated confidence bounds to the agricultural apparatus 111, such that the computer system within the agricultural apparatus 111 may update scheduled watering times and the corresponding durations to reflect the optimal level of water needed to spray onto the target geo-locations based upon the received estimated rainfall values and their associated confidence intervals. For example, if the currently scheduled watering times and duration specify watering a geo-location in the morning for 20 minutes and the agricultural apparatus 111 received confidence bounds information that specified that the geo-location received rainfall ranging from 10 cm to 25 cm, then the agricultural apparatus 111 may update the scheduled watering times and duration by reducing the duration from 20 minutes to 5 minutes.

Calculated confidence bounds may also be stored within the model and field data repository 160 for future validation against externally reported rainfall values. In an embodiment, the confidence bounds aggregation instructions 182 may provide instruction to the agricultural intelligence computer system 130 to store the aggregated confidence bounds in the model and field data repository. Stored aggregated confidence bounds may then be compared to externally reported rainfall data for specific geo-locations in order to validate the accuracy of the digital rainfall model used to generate the adjusted rainfall values and the aggregated confidence bounds. For example, the Community Collaborative Rain, Hail, and Snow Network (CoCoRaHS) stores rain-gauge information accumulated over 24-periods for specific geo-locations. In an embodiment, the agricultural intelligence computer system 130 may retrieve historical rain-gauge observations from CoCoRaHS for available geo-locations and the compare the rain-gauge observations to the stored aggregated confidence bounds to determine the accuracy of the calculated confidence bounds. In an embodiment, discrepancies between historical rain-gauge data and the aggregated confidence bounds may be used as feedback input to improve the accuracy of generated digital rainfall models.

What is claimed is:

1. A method comprising:

using rainfall calculation instructions in a server computer system, receiving one or more agricultural data records that represent observed agricultural data points for specific geo-locations at a specific time, wherein the observed agricultural data points include at least one of observed radar data or rain gauge data that comprise a plurality of precipitation data values and that have been obtained from radar computers coupled to radars or a weather station computers coupled to rain gauges;

using the rainfall calculation instructions, aggregating the one or more agricultural data records into one or more agricultural data sets, where each agricultural data set from the one or more agricultural data sets represents a single type of observed agricultural data;

using rainfall estimation instructions in the server computer system, estimating a set of adjusted rainfall values for a set of geo-locations using the one or more agricultural data sets, wherein the set of adjusted rainfall values represent calculated rainfall value estimations;

using rainfall confidence bounds instructions, estimating a set of confidence bounds for the set of adjusted rainfall values, wherein the set of confidence bounds provides a range for each adjusted rainfall value in the set of adjusted rainfall values that represents a particular level of confidence for the set of adjusted rainfall values;

using confidence bound aggregation instructions in the server computer system, determining an aggregated confidence bounds for a rainfall estimate over a specific period of time by calculating lower precipitation estimates by aggregating lower confidence bounds from the set of confidence bounds for each geo-location over the specific period of time; calculating upper precipitation estimates by aggregating upper confidence bounds from the set of confidence bounds for each geo-location over the specific period of time; using the confidence bound aggregation instructions, generating a set of aggregated confidence bounds comprising aggregated lower and aggregated upper confidence bounds for each geo-location in the set of geo-locations.

2. The method of claim 1, wherein estimating a set of adjusted rainfall values for a set of geo-locations using the one or more agricultural data sets further comprises:

transforming the one or more agricultural data sets into one or more agricultural distribution sets, where the one or more agricultural distribution sets represent a normalized distribution of the one or more agricultural data sets;

generating a covariate matrix from the one or more agricultural distribution sets and storing the covariate matrix in digital memory, by deriving at least some values within the covariate matrix from the one or more agricultural distribution sets;

estimating the set of adjusted rainfall values for the set of geo-locations that correspond to the values within the covariate matrix using defined regression parameters from a digital rainfall regression model and previously stored adjusted rainfall data sets.

3. The method of claim 2, wherein estimating the set of adjusted rainfall values for the set of geo-locations that correspond to the values within the covariate matrix using defined regression parameters from a digital rainfall regression model and previously stored adjusted rainfall data sets comprises generating a joint distribution between the one or more agricultural distribution sets and the previously stored adjusted rainfall data sets.

4. The method of claim 3, wherein estimating a set of confidence bounds for the set of adjusted rainfall values further comprises:

generating an inverse cumulative distribution based upon mean and variance values for the set of adjusted rainfall values from the joint distribution;

determining a lower confidence bound as a 10th percentile of the inverse cumulative distribution;

determining an upper confidence bound as a 90th percentile of the inverse cumulative distribution;

compiling the set of confidence bounds for the set of adjusted rainfall values, wherein each confidence bounds in the set of confidence bounds includes a pair of bounds comprising the lower confidence bound and the upper confidence bound.

5. The method of claim 1, wherein estimating a set of adjusted rainfall values for a set of geo-locations using the one or more agricultural data sets further comprises:

calculating a correction factor that describes correlation of values between agricultural data points that represent observed radar data and agricultural data points that represent rain gauge data;

wherein the correction factor is an aggregate ratio calculated as a sum of the agricultural data points that represent rain gauge data from the one or more agricultural data sets divided by a sum of the agricultural data points that represent observed radar data from the one or more agricultural data sets;

calculating the set of adjusted rainfall values for the set of geo-locations by multiplying agricultural data points that represent observed radar data for the set of geo-locations by the correction factor.

6. The method of claim 5, wherein estimating a set of confidence bounds for the set of adjusted rainfall values further comprises:

calculating a set of subsampled correction factors from the one or more agricultural data sets, wherein each subsampled correction factor of the set of subsampled correction factors is calculated from a subset of the one or more agricultural data sets that represent agricultural data records received at over a specific time period;

generating a correction factor distribution of the set of subsampled correction factors;

generating an inverse cumulative distribution function based upon the correction factor distribution of the set of subsampled correction factors;

determining a lower confidence bound as a 10th percentile of the inverse cumulative distribution function;

determining an upper confidence bound as a 90th percentile of the inverse cumulative distribution function;

compiling the set of confidence bounds for the set of adjusted rainfall values, wherein each confidence bounds in the set of confidence bounds includes a pair of bounds comprising the lower confidence bound and the upper confidence bound.

7. The method of claim 5, wherein estimating a set of confidence bounds for the set of adjusted rainfall values further comprises:

calculating a set of correction factors based upon the one or more agricultural data sets, wherein each correction factor in the set of correction factors represents a specific geo-location within the one or more agricultural data sets and is a ratio calculated as rain gauge data at the specific geo-location divided by observed radar data at the specific geo-location;

generating a correction factor distribution set based upon the set of correction factors;

determining a lower confidence bound as a 10th percentile of the correction factor distribution set;

determining an upper confidence bound as a 90th percentile of the correction factor distribution set;

compiling the set of confidence bounds for the set of adjusted rainfall values, wherein each confidence bounds in the set of confidence bounds includes a pair of bounds comprising the lower confidence bound and the upper confidence bound.

8. The method of claim 1, wherein estimating a set of adjusted rainfall values for a set of geo-locations using the one or more agricultural data sets further comprises:

generating a gamma distribution set based upon the one or more agricultural data sets, wherein the gamma distribution set comprises rain gauge-to-radar ratio values that are each calculated as rain gauge data divided by corresponding observed radar data for a specific geo-location at a specific time;

calculating a set of gamma distribution parameters based upon the gamma distribution set;

calculating the set of adjusted rainfall values for the set of geo-locations based upon the gamma distribution set and the set of gamma distribution parameters.

9. The method of claim 8, wherein estimating a set of confidence bounds for the set of adjusted rainfall values further comprises:

generating a cumulative distribution based upon shape and scale parameters from the set of gamma distribution parameters;

determining a set of marginal distributions for the set of geo-locations based upon the cumulative distribution;

determining a lower confidence bound as a 10th percentile of the set of marginal distributions;

determining an upper confidence bound as a 90th percentile of the set of marginal distributions;

compiling the set of confidence bounds for the set of adjusted rainfall values, wherein each confidence bounds in the set of confidence bounds includes a pair of bounds comprising the lower confidence bound and the upper confidence bound.

10. The method of claim 1, further comprising:
using confidence bound aggregation instructions in a server computer system, determining a set of aggregated confidence bounds for a rainfall estimate over a specific period of time by determining a quadrature for specific sub-time intervals that make up the specific period of time for a specific geo-location in the set of geo-locations;
wherein the quadrature is calculated as a square root of a sum of differences squared between a lower confidence bound and an upper confidence bound within the set of confidence bounds for each of the specific sub-time intervals;
using the confidence bound aggregation instructions, generating a set of aggregated confidence bounds comprising aggregated confidence bounds for each geo-location in the set of geo-locations.

11. The method of claim 1, further comprising:
causing displaying of the set of confidence bounds in a graphical display of the set of geo-locations, wherein the set of confidence bounds are displayed as rainfall data for the set of geo-locations.

12. The method of claim 1, further comprising:
causing exporting of confidence bounds data to one or more agricultural equipment, wherein the confidence bounds data comprises formatted data of at least the set of confidence bounds for the set of geo-locations or instructions for updating agricultural tasks for the set of geo-locations based upon the set of confidence bounds.

13. A data processing system comprising:
a memory;
one or more processors coupled to the memory;
rainfall calculation instructions stored in memory, executed by the one or more processors, and configured to cause the one or more processors to receive one or more agricultural data records that represent observed agricultural data points for specific geo-locations at a specific time, wherein the observed agricultural data points include at least one of observed radar data or rain gauge data that comprise a plurality of precipitation data values and that have been obtained from radar computers coupled to radars or a weather station computers coupled to rain gauges;
the rainfall calculation instructions stored in memory, executed by the one or more processors, and configured to cause the one or more processors to aggregate the one or more agricultural data records into one or more agricultural data sets, where each agricultural data set from the one or more agricultural data sets represents a single type of observed agricultural data;
rainfall estimation instructions stored in memory, executed by the one or more processors, and configured to cause the one or more processors to estimate a set of adjusted rainfall values for a set of geo-locations using the one or more agricultural data sets, wherein the set of adjusted rainfall values represent calculated rainfall value estimations;
rainfall confidence bounds instructions stored in memory, executed by the one or more processors, and configured to cause the one or more processors to estimate a set of confidence bounds for the set of adjusted rainfall values, wherein the set of confidence bounds provides a range for each adjusted rainfall value in the set of adjusted rainfall values that represents a particular level of confidence for the set of adjusted rainfall values;
confidence bounds aggregation instructions stored in memory, executed by the one or more processors, and configured to cause the one or more processors to determine a set of aggregated confidence bounds for a rainfall estimate over a specific period of time by determining a quadrature for specific sub-time intervals that make up the specific period of time for a specific geo-location in the set of geo-locations; wherein the quadrature is calculated as a square root of a sum of differences squared between a lower confidence bound and an upper confidence bound within the set of confidence bounds for each of the specific sub-time intervals; generate a set of aggregated confidence bounds comprising aggregated confidence bounds for each geo-location in the set of geo-locations.

14. The data processing system of claim 13, wherein the rainfall estimation instructions stored in memory, executed by the one or more processors, and configured to further cause the one or more processors to:
transform the one or more agricultural data sets into one or more agricultural distribution sets, where the one or more agricultural distribution sets represent a normalized distribution of the one or more agricultural data sets;
generate a covariate matrix from the one or more agricultural distribution sets and storing the covariate matrix in digital memory, by deriving at least some values within the covariate matrix from the one or more agricultural distribution sets;
estimate the set of adjusted rainfall values for the set of geo-locations that correspond to the values within the covariate matrix using defined regression parameters from a digital rainfall regression model and previously stored adjusted rainfall data sets.

15. The data processing system of claim 14, wherein the rainfall estimation instructions stored in memory and configured to further cause the one or more processors to estimate the set of adjusted rainfall values for the set of geo-locations that correspond to the values within the covariate matrix using defined regression parameters from a digital rainfall regression model and previously stored adjusted rainfall data sets comprises instructions to cause the one or more processors to generate a joint distribution between the one or more agricultural distribution sets and the previously stored adjusted rainfall data sets.

16. The data processing system of claim 15, wherein the rainfall confidence bounds instructions stored in memory, executed by the one or more processors, and configured to further cause the one or more processors to:
generate an inverse cumulative distribution based upon mean and variance values for the set of adjusted rainfall values from the joint distribution;
determine a lower confidence bound as a 10th percentile of the inverse cumulative distribution;
determine an upper confidence bound as a 90th percentile of the inverse cumulative distribution;
compile the set of confidence bounds for the set of adjusted rainfall values, wherein each confidence bounds in the set of confidence bounds includes a pair of bounds comprising the lower confidence bound and the upper confidence bound.

17. The data processing system of claim 13, wherein the rainfall estimation instructions stored in memory, executed by the one or more processors, and configured to further cause the one or more processors to:
- calculate a correction factor that describes correlation of values between agricultural data points that represent observed radar data and agricultural data points that represent rain gauge data;
- wherein the correction factor is an aggregate ratio calculated as a sum of the agricultural data points that represent rain gauge data from the one or more agricultural data sets divided by a sum of the agricultural data points that represent observed radar data from the one or more agricultural data sets;
- calculate the set of adjusted rainfall values for the set of geo-locations by multiplying agricultural data points that represent observed radar data for the set of geo-locations by the correction factor.

18. The data processing system of claim 17, wherein the rainfall confidence bounds instructions stored in memory, executed by the one or more processors, and configured to further cause the one or more processors to:
- calculate a set of subsampled correction factors from the one or more agricultural data sets, wherein each subsampled correction factor of the set of subsampled correction factors is calculated from a subset of the one or more agricultural data sets that represent agricultural data records received at over a specific time period;
- generate a correction factor distribution of the set of subsampled correction factors;
- generate an inverse cumulative distribution function based upon the correction factor distribution of the set of subsampled correction factors;
- determine a lower confidence bound as a 10th percentile of the inverse cumulative distribution function;
- determine an upper confidence bound as a 90th percentile of the inverse cumulative distribution function;
- compile the set of confidence bounds for the set of adjusted rainfall values, wherein each confidence bounds in the set of confidence bounds includes a pair of bounds comprising the lower confidence bound and the upper confidence bound.

19. The data processing system of claim 17, wherein the rainfall confidence bounds instructions stored in memory, executed by the one or more processors, and configured to further cause the one or more processors to:
- calculate a set of correction factors based upon the one or more agricultural data sets, wherein each correction factor in the set of correction factors represents a specific geo-location within the one or more agricultural data sets and is a ratio calculated as rain gauge data at the specific geo-location divided by observed radar data at the specific geo-location;
- generate a correction factor distribution set based upon the set of correction factors;
- determine a lower confidence bound as a 10th percentile of the correction factor distribution set;
- determine an upper confidence bound as a 90th percentile of the correction factor distribution set;
- compile the set of confidence bounds for the set of adjusted rainfall values, wherein each confidence bounds in the set of confidence bounds includes a pair of bounds comprising the lower confidence bound and the upper confidence bound.

20. The data processing system of claim 13, wherein the rainfall estimation instructions stored in memory, executed by the one or more processors, and configured to further cause the one or more processors to:
- generate a gamma distribution set based upon the one or more agricultural data sets, wherein the gamma distribution set comprises rain gauge-to-radar ratio values that are each calculated as rain gauge data divided by corresponding observed radar data for a specific geo-location at a specific time;
- calculate a set of gamma distribution parameters based upon the gamma distribution set;
- calculate the set of adjusted rainfall values for the set of geo-locations based upon the gamma distribution set and the set of gamma distribution parameters.

21. The data processing system of claim 20, wherein the rainfall confidence bounds instructions stored in memory, executed by the one or more processors, and configured to further cause the one or more processors to:
- generate a cumulative distribution based upon shape and scale parameters from the set of gamma distribution parameters;
- determine a set of marginal distributions for the set of geo-locations based upon the cumulative distribution;
- determine a lower confidence bound as a 10th percentile of the set of marginal distributions;
- determine an upper confidence bound as a 90th percentile of the set of marginal distributions;
- compile the set of confidence bounds for the set of adjusted rainfall values, wherein each confidence bounds in the set of confidence bounds includes a pair of bounds comprising the lower confidence bound and the upper confidence bound.

22. The data processing system of claim 13, further comprising confidence bounds aggregation instructions stored in memory, executed by the one or more processors, and configured to cause the one or more processors to:
- determine a set of aggregated confidence bounds for a rainfall estimate over a specific period of time by determining a quadrature for specific sub-time intervals that make up the specific period of time for a specific geo-location in the set of geo-locations;
- wherein the quadrature is calculated as a square root of a sum of differences squared between a lower confidence bound and an upper confidence bound within the set of confidence bounds for each of the specific sub-time intervals;
- generate a set of aggregated confidence bounds comprising aggregated confidence bounds for each geo-location in the set of geo-locations.

23. The data processing system of claim 13, further comprising instructions stored in memory, executed by the one or more processors, and configured to cause the one or more processors to cause display of the set of confidence bounds in a graphical display of the set of geo-locations, wherein the set of confidence bounds are displayed as rainfall data for the set of geo-locations.

24. The data processing system of claim 13, further comprising instructions stored in memory, executed by the one or more processors, and configured to cause the one or more processors to cause export of confidence bounds data to one or more agricultural equipment, wherein the confidence bounds data comprises formatted data of at least the set of confidence bounds for the set of geo-locations or instructions for updating agricultural tasks for the set of geo-locations based upon the set of confidence bounds.

* * * * *